(12) United States Patent
Song et al.

(10) Patent No.: US 11,907,015 B2
(45) Date of Patent: Feb. 20, 2024

(54) DISPLAY DEVICE

(71) Applicant: LG Display Co., Ltd., Seoul (KR)

(72) Inventors: Hyunjoo Song, Seongnam-si (KR); Jaekyung Choi, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/675,880

(22) Filed: Nov. 6, 2019

(65) Prior Publication Data
US 2020/0159288 A1 May 21, 2020

(30) Foreign Application Priority Data
Nov. 15, 2018 (KR) .......................... 10-2018-0140548

(51) Int. Cl.
*G06F 1/16* (2006.01)
*G03B 21/58* (2014.01)
*G09F 9/30* (2006.01)

(52) U.S. Cl.
CPC ........... *G06F 1/1652* (2013.01); *G03B 21/58* (2013.01); *G09F 9/301* (2013.01)

(58) Field of Classification Search
CPC ........ G06F 1/1652; G03B 21/58; G09F 9/301
USPC .................................................... 361/679.27
See application file for complete search history.

(56) References Cited

U.S. PATENT DOCUMENTS

| | | | |
|---|---|---|---|
| 7,586,131 B2 * | 9/2009 | Nishiki | H10K 19/00 257/E21.046 |
| 7,636,085 B2 * | 12/2009 | Yang | G06F 1/1652 345/204 |
| 8,493,714 B2 * | 7/2013 | Visser | G06F 1/1615 361/679.01 |
| 8,654,519 B2 * | 2/2014 | Visser | G09F 11/30 361/679.21 |
| 9,098,241 B1 * | 8/2015 | Cho | B65H 75/28 |
| 9,618,975 B2 * | 4/2017 | Su | G06F 1/1652 |
| 9,625,948 B2 * | 4/2017 | Zhang | G06F 1/1652 |
| 9,743,542 B2 * | 8/2017 | Heo | G06F 1/1675 |
| 9,760,975 B2 * | 9/2017 | Kim | G09F 9/00 |
| 9,844,152 B2 * | 12/2017 | Heo | G06F 1/1652 |
| 9,864,412 B2 * | 1/2018 | Park | G06F 1/1652 |
| 10,111,344 B2 * | 10/2018 | Han | H05K 5/03 |
| 10,128,458 B2 * | 11/2018 | Lee | H10K 50/84 |

(Continued)

FOREIGN PATENT DOCUMENTS

| | | | |
|---|---|---|---|
| CN | 105247597 A | 1/2016 | |
| CN | 105741683 A | 7/2016 | |

(Continued)

OTHER PUBLICATIONS

Jin-Seong Park, et al., Thin film encapsulation for flexible AM-OLED: a review, Feb. 14, 2011, Semiconductor Science Technology, 26 034001, all pages (Year: 2011).*

(Continued)

*Primary Examiner* — Abhishek M Rathod
*Assistant Examiner* — Keith DePew
(74) *Attorney, Agent, or Firm* — Morgan, Lewis & Bockius LLP

(57) ABSTRACT

A disclosed display device includes a display panel configured to display an image and a back cover on a rear surface of the display panel and including a magnetic material. The display device further includes a roller configured to wind or unwind the back cover and the display panel.

20 Claims, 17 Drawing Sheets

VIEW DIRECTION

(56) References Cited

U.S. PATENT DOCUMENTS

| | | | |
|---|---|---|---|
| 10,141,525 B2* | 11/2018 | Ito | H10K 77/111 |
| 10,175,792 B2* | 1/2019 | Kim | G09F 9/301 |
| 10,186,681 B2* | 1/2019 | Kang | H10K 59/00 |
| 10,201,103 B2* | 2/2019 | Kim | H10K 77/111 |
| 10,203,531 B2* | 2/2019 | Choi | G06F 1/1626 |
| 10,223,942 B2* | 3/2019 | Chu | G09F 9/301 |
| 10,241,542 B2* | 3/2019 | Kwak | G06F 1/1652 |
| 10,254,797 B2* | 4/2019 | Lee | H10K 50/84 |
| 10,257,945 B2* | 4/2019 | Kim | H05K 1/147 |
| 10,288,922 B2* | 5/2019 | Cho | H10K 50/84 |
| 10,314,183 B2* | 6/2019 | Heo | G06F 1/1681 |
| 10,319,263 B2* | 6/2019 | Lee | G06F 1/1652 |
| 10,362,690 B2* | 7/2019 | Han | G02F 1/1333 |
| 10,390,443 B2* | 8/2019 | Kim | G06F 1/1601 |
| 10,424,229 B2* | 9/2019 | Kim | H04M 1/0268 |
| 10,439,154 B2* | 10/2019 | Kim | H10K 77/111 |
| 10,481,640 B2* | 11/2019 | Kim | G09F 9/301 |
| 10,506,726 B2* | 12/2019 | Kang | H10K 77/111 |
| 10,531,582 B2* | 1/2020 | Park | G09F 9/301 |
| 10,534,402 B1* | 1/2020 | Kim | H05K 5/0217 |
| 10,535,836 B2* | 1/2020 | Kim | G06F 1/1652 |
| 10,564,676 B2* | 2/2020 | Kwon | H04N 5/64 |
| 10,582,628 B2* | 3/2020 | Kim | B21B 39/008 |
| 10,617,017 B2* | 4/2020 | Park | H05K 5/0217 |
| 10,631,402 B2* | 4/2020 | Xiang | G09F 9/301 |
| 10,684,652 B2* | 6/2020 | Kim | G02F 1/133528 |
| 10,687,428 B2* | 6/2020 | Kim | G02F 1/13 |
| 10,777,102 B2* | 9/2020 | Cho | H05K 5/0217 |
| 10,782,740 B2* | 9/2020 | Kim | H04N 5/642 |
| 11,398,607 B2* | 7/2022 | Lee | C09D 175/04 |
| 2011/0227822 A1* | 9/2011 | Shai | G06F 1/169 |
| | | | 345/156 |
| 2011/0243789 A1 | 10/2011 | Roberts | |
| 2015/0220118 A1* | 8/2015 | Kwak | G09F 9/301 |
| | | | 345/520 |
| 2015/0220119 A1* | 8/2015 | Seo | G09G 5/37 |
| | | | 345/173 |
| 2015/0227171 A1 | 8/2015 | Choi et al. | |
| 2016/0029474 A1* | 1/2016 | Cho | B65H 75/28 |
| | | | 361/749 |
| 2016/0155965 A1* | 6/2016 | Kusuura | H10K 71/50 |
| | | | 29/829 |
| 2016/0155966 A1* | 6/2016 | Kim | H10K 77/111 |
| | | | 257/40 |
| 2016/0161983 A1* | 6/2016 | Lee | G09F 9/301 |
| | | | 361/749 |
| 2016/0187929 A1 | 6/2016 | Kim et al. | |
| 2016/0231843 A1* | 8/2016 | Kim | G06F 3/041 |
| 2016/0288462 A1* | 10/2016 | Yin | B32B 27/06 |
| 2016/0306392 A1* | 10/2016 | Park | G06F 3/041 |
| 2016/0374228 A1* | 12/2016 | Park | G09F 9/301 |
| 2017/0013726 A1* | 1/2017 | Han | H05K 5/03 |
| 2017/0031388 A1* | 2/2017 | Han | G06F 1/1601 |
| 2017/0060183 A1* | 3/2017 | Zhang | G06F 1/1615 |
| 2017/0156219 A1* | 6/2017 | Heo | G09F 9/301 |
| 2017/0156220 A1* | 6/2017 | Heo | H05K 5/0017 |
| 2017/0156225 A1* | 6/2017 | Heo | H05K 5/0217 |
| 2017/0161868 A1* | 6/2017 | Kim | G09F 9/301 |
| 2017/0196102 A1* | 7/2017 | Shin | G06F 1/1652 |
| 2017/0196103 A1* | 7/2017 | Cho | H04M 1/0268 |
| 2017/0222178 A1* | 8/2017 | Kang | H10K 50/84 |
| 2017/0278436 A1* | 9/2017 | Chu | H10K 77/111 |
| 2017/0301699 A1* | 10/2017 | Yamazaki | H01L 29/7869 |
| 2017/0318688 A1* | 11/2017 | Kim | H05K 5/0017 |
| 2017/0318692 A1* | 11/2017 | Lee | G06F 1/1658 |
| 2017/0367198 A1* | 12/2017 | Park | H10K 50/84 |
| 2018/0070466 A1* | 3/2018 | Kim | H10K 50/84 |
| 2018/0070467 A1* | 3/2018 | Kim | H05K 5/0017 |
| 2018/0107250 A1 | 4/2018 | Cho | |
| 2018/0160554 A1* | 6/2018 | Kang | H10K 50/84 |
| 2018/0341142 A1* | 11/2018 | Choi | G06F 1/1626 |
| 2018/0359869 A1* | 12/2018 | Kim | H05K 5/0217 |
| 2018/0375054 A1* | 12/2018 | Wang | H10K 50/841 |
| 2019/0098774 A1* | 3/2019 | Park | H05K 5/0217 |
| 2019/0098776 A1* | 3/2019 | Jeon | H05K 5/0217 |
| 2019/0150300 A1* | 5/2019 | Kim | H05K 5/0217 |
| | | | 361/807 |
| 2019/0182947 A1* | 6/2019 | Xiang | H05K 1/028 |
| 2019/0198783 A1* | 6/2019 | Kim | H10K 59/12 |
| 2019/0212780 A1* | 7/2019 | Choi | G02F 1/133 |
| 2019/0246512 A1* | 8/2019 | Heo | G06F 1/1681 |
| 2020/0004296 A1* | 1/2020 | Lee | G06F 1/1641 |
| 2020/0008308 A1* | 1/2020 | Shin | H05K 5/0017 |
| 2020/0008309 A1* | 1/2020 | Kim | H10K 50/844 |
| 2020/0043386 A1* | 2/2020 | Kim | G09F 9/301 |
| 2020/0068728 A1* | 2/2020 | Kang | G09F 9/301 |
| 2020/0077194 A1* | 3/2020 | Kim | H04R 1/288 |
| 2020/0084897 A1* | 3/2020 | Shin | H05K 5/0017 |
| 2020/0093011 A1* | 3/2020 | Lee | H05K 5/0217 |
| 2020/0103741 A1* | 4/2020 | Song | G03B 21/58 |
| 2020/0127230 A1* | 4/2020 | Moon | H10K 50/844 |
| 2020/0135065 A1* | 4/2020 | Song | H05K 1/028 |
| 2020/0154580 A1* | 5/2020 | Shin | G02F 1/133305 |
| 2020/0160760 A1* | 5/2020 | Park | H04R 9/066 |
| 2020/0170114 A1* | 5/2020 | Choi | H05K 5/0217 |

FOREIGN PATENT DOCUMENTS

| | | |
|---|---|---|
| CN | 106128312 A | 11/2016 |
| CN | 205750635 U | 11/2016 |
| CN | 106409147 A | 2/2017 |
| CN | 205943347 U | 2/2017 |
| CN | 207676581 U | 7/2018 |
| EP | 3 115 988 A1 | 1/2017 |
| JP | 2017-227863 A | 12/2017 |
| KR | 10-2016-0127220 A | 11/2016 |
| KR | 10-2017-0080746 A | 7/2017 |
| KR | 10-2018-0027318 A | 3/2018 |
| KR | 10-2018-0043441 A | 4/2018 |

OTHER PUBLICATIONS

First Notification of Office Action dated May 6, 2021, issued in corresponding Chinese Patent Application No. 201911080273.0. Note: US 2017/0367198 cited therein is already of record.

Office Action dated Jun. 28, 2022, issued in counterpart Korean Patent Application No. 10-2018-0140548.

Notice of Allowance dated Jun. 19, 2023, issued in corresponding Korean Patent Application No. 10-2018-0140548.

* cited by examiner

DISPLAY DEVICE

CROSS-REFERENCE TO RELATED APPLICATIONS

This application claims the benefit and priority of Korean Patent Application No. 10-2018-0140548 filed on Nov. 15, 2018, in the Korean Intellectual Property Office, the disclosure of which is incorporated herein by reference as if fully set forth herein.

BACKGROUND

1. Technical Field

The present disclosure relates to a display device, and more particularly, to a rollable display device with an improved rolling property and capable of displaying images even in a rolled state.

2. Description of the Related Art

Display devices used for a computer monitor, a TV, a mobile phone, and other applications include, among others, an organic light-emitting display (OLED) that emits light by itself and a liquid-crystal display (LCD) that requires a separate light source.

As display devices are applied to increasingly diverse fields, such as a computer monitor, a TV, and a personal mobile device, display devices having a large display area and a reduced volume and weight are being studied.

Recently, a rollable display device in which a display unit and wiring lines are formed on a flexible substrate made of flexible plastic and which can display an image even in a rolled state is attracting attention as a next generation display device.

SUMMARY

An object of the present disclosure is to provide a rollable display device including a back cover with a reduced thickness to improve a rolling property.

Another object of the present disclosure is to provide a display device including a back cover which includes a magnetic material to be more easily and securely attachable to or detachable from the display panel.

Still another object of the present disclosure is to provide a display device capable of minimizing or suppressing an interference phenomenon generated in a driving IC due to the magnetic property of the back cover.

Another object of the present disclosure is to provide a display device having an improved side surface rigidity.

Objects of the present disclosure are not limited to the examples noted above, and other objects may be apparent to or understood by those skilled in the art from the present disclosure, including the detailed description and drawings.

To achieve these and other advantages and in accordance with the purpose of the present disclosure, as embodied and broadly described, a display device may include: a display panel configured to display an image; a back cover on a rear surface of the display panel and including a magnetic material; and a roller configured to wind or unwind the back cover and the display panel.

According to another aspect of the present disclosure, a display device includes: a display panel configured to display images and including a substrate; a back cover including a magnetic material and attached to the substrate of the display panel, the substrate including a metal material; and a roller configured to wind or unwind the back cover and the display panel.

Other details of example embodiments are included in the detailed description and the drawings.

According to the present disclosure, the back cover may include a magnetic material to allow the back cover to have a smaller thickness, thereby improving the rolling property of the display device.

According to the present disclosure, the back cover may include a magnetic material to be more easily and securely attachable to and detachable from the display panel, so that various forms of structural design of the display device may be flexibly employed.

According to the present disclosure, the interference phenomenon of the driving IC due to the magnetic property of the back cover may be minimized or suppressed.

According to the present disclosure, a resin may be disposed on a rear surface of the back cover so that a potential damage to the display panel due to the back cover may be prevented or mitigated.

The potential benefits and advantages according to the present disclosure are not limited to the examples listed above, and various additional benefits and advantages may be discussed in or apparent from the present disclosure.

It is to be understood that both the foregoing general description and the following detailed description of the present disclosure are exemplary and explanatory, and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1A:
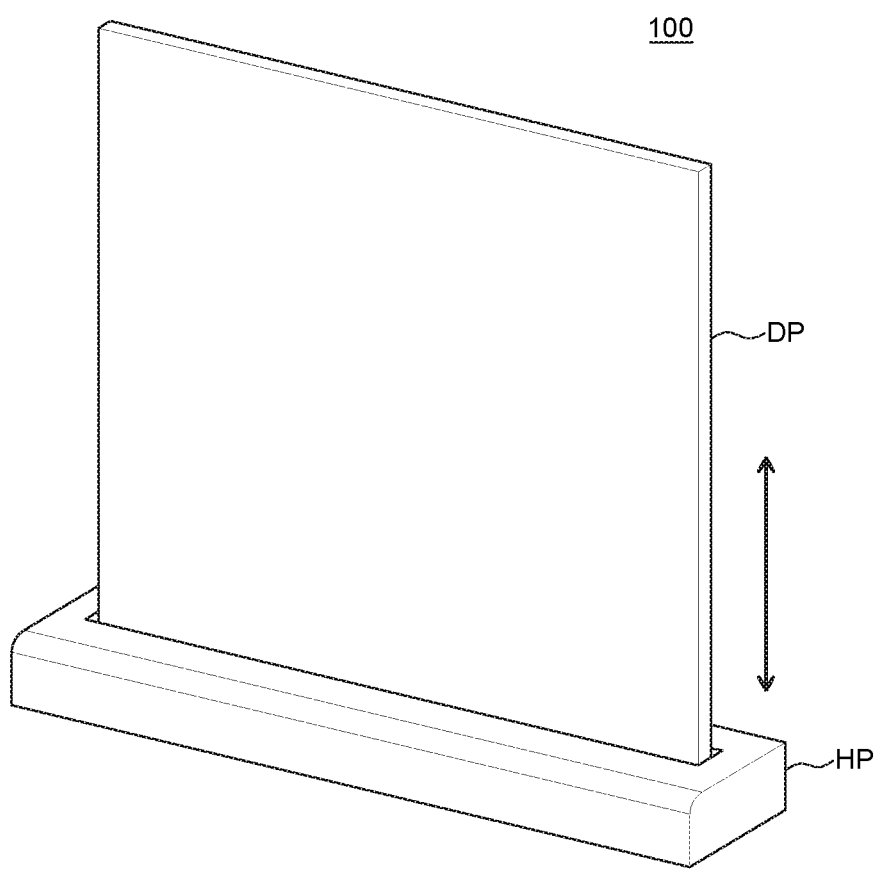
FIGS. 1A and 1B are perspective views of a display device according to an example embodiment of the present disclosure.

Reference will now be made in detail to embodiments of the present disclosure, examples of which are illustrated in the accompanying drawings.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents.

A shape, a size, a ratio, an angle, and a number disclosed in the drawings for describing embodiments of the present disclosure are merely an example. Thus, the present disclosure is not limited to the illustrated details. Unless otherwise described, like reference numerals refer to like elements throughout. In the following description, when the detailed description of the relevant known function or configuration is determined to obscure an important point of the present disclosure unnecessarily, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range is provided.

In describing a position relationship, when a position relation between two parts is described as, for example, "on," "over," "under," or "next," one or more other parts may be disposed between the two parts unless a more limiting term, such as "immediate(ly)" or "direct(ly)," is used. For example, when an element or layer is disposed "on" another element or layer, a third layer or element may be interposed therebetween.

Although the terms "first," "second," and the like may be used herein to describe various elements, these elements should not be limited by these terms as they are not used to define a particular order. These terms are used only to distinguish one element from another. For example, a first element could be termed a second element, and, similarly, a second element could be termed a first element, without departing from the scope of the present disclosure.

A size and a thickness of each component illustrated in the drawings are illustrated for convenience of description, and the present disclosure is not limited to the size and the thickness of the component illustrated, unless otherwise stated.

Features of various embodiments of the present disclosure may be partially or overall coupled to or combined with each other, and may be variously inter-operated with each other and driven technically, as those skilled in the art can sufficiently understand. Embodiments of the present disclosure may be carried out independently from each other, or may be carried out in association with each other.

Hereinafter, a display device according to example embodiments of the present disclosure will be described in detail with reference to accompanying drawings.

<Display Device—Rollable Display Device>

A rollable display device may refer to a display device capable of displaying images even in a rolled state. The rollable display device may have higher flexibility than typical conventional display devices. Depending on whether the rollable display device is in use, a shape of the rollable display device may be freely varied. Specifically, when the rollable display device is not in use, the rollable display device may be rolled to be stored with a reduced volume. On the other hand, when the rollable display device is in use, the rolled rollable display device may be unrolled to be used, e.g., to display images.

Figure 1B:
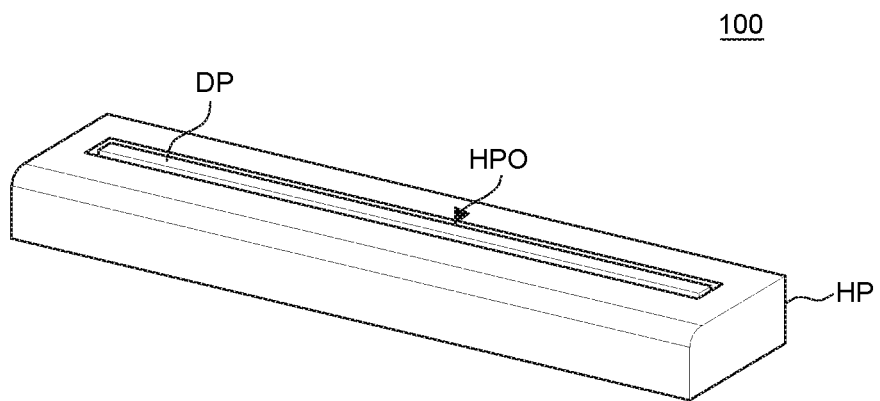

FIGS. 1A and 1B are perspective views of a display device according to an example embodiment of the present disclosure. As shown in FIGS. 1A and 1B, a display device 100 according to an example embodiment of the present disclosure includes a display unit DP and a housing unit HP.

The display unit DP is configured to display images to a user. For example, display elements, circuits for driving the display elements, lines, and other components may be disposed in the display unit DP. The display device 100 here according to an example embodiment of the present disclosure is a rollable display device 100. Therefore, the display unit DP may be configured to be wound and unwound. For example, the display unit DP may include a display panel and a back cover which are flexible so as to be capable of being wound or unwound. The display unit DP will be described below in more detail with reference to FIGS. 5 through 7C.

The housing unit HP serves as a case in which the display unit DP may be housed. The display unit DP may be wound and housed in the housing unit HP, for example, as shown in FIG. 1B. Also, the display unit DP may be unwound and disposed outside the housing unit HP, for example, as shown in FIG. 1A.

The housing unit HP may have an opening HPO through which the display unit DP can move in and out of the housing unit HP. The display unit DP may move up and down in a vertical direction through the opening HPO of the housing unit HP.

The display unit DP of the display device 100 may be converted from a fully unwound state to a fully wound state, and vice versa.

FIG. 1A illustrates a fully unwound state of the display unit DP of the display device 100. In the fully unwound state, the display unit DP of the display device 100 is disposed outside the housing unit HP. That is, the fully unwound state can be viewed as a state in which the display unit DP is unwound to a maximum extent so as not to be further unwound and is presented outside the housing unit HP in order for the user to watch images on the display device 100.

FIG. 1B illustrates a fully wound state of the display unit DP of the display device 100. The fully wound state refers to a state in which the display unit DP of the display device 100 is housed inside the housing unit HP so as not to be further wound. That is, the fully wound state may be viewed as a state in which the display unit DP is wound and housed inside the housing unit HP. When the user is not watching images on the display device 100, it may be preferable for the sake of external appearance to have the display unit DP housed inside the housing unit HP. Further, in the fully wound state in which the display unit DP is housed inside the housing unit HP, the display device 100 is reduced in volume and easy to transport.

A driving unit for winding or unwinding the display unit DP to change the display unit DP between the fully unwound state and the fully wound state is provided in an example embodiment.

<Driving Unit>

Figure 2:
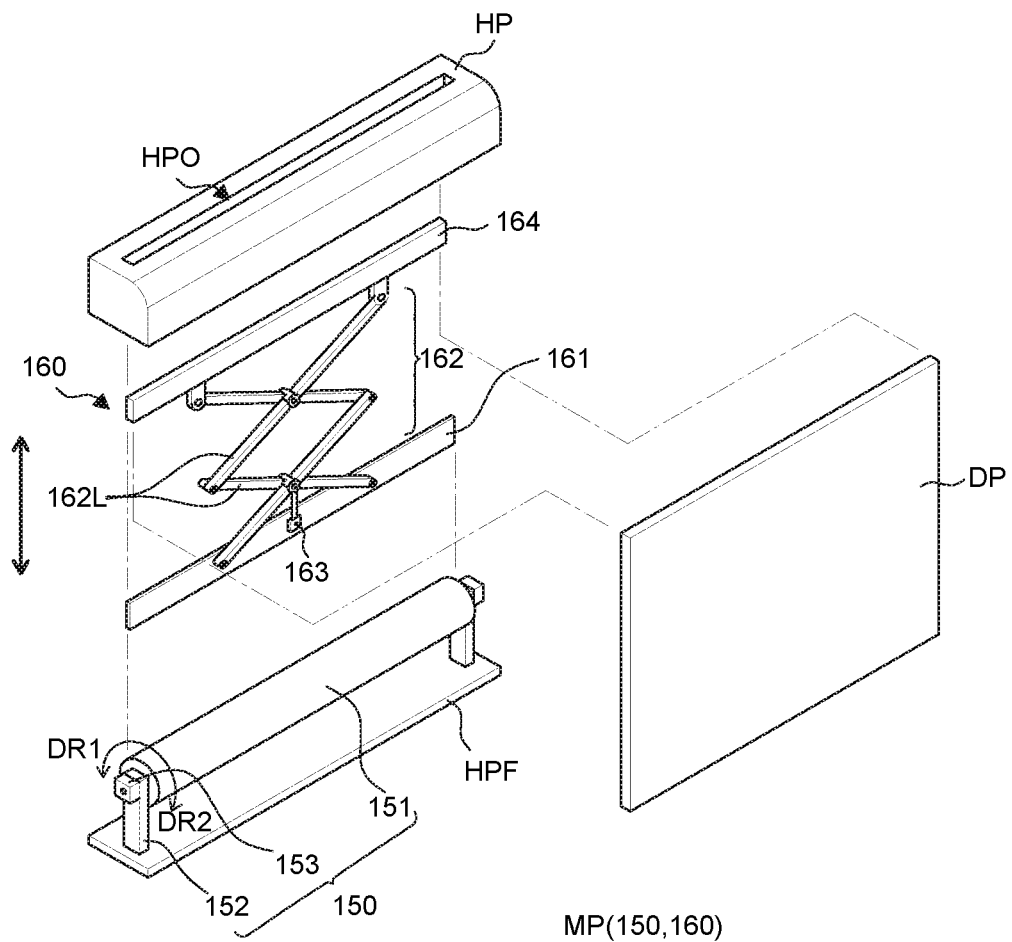
FIG. 2 is an exploded perspective view of a display device according to an example embodiment of the present disclosure.
Figure 3:
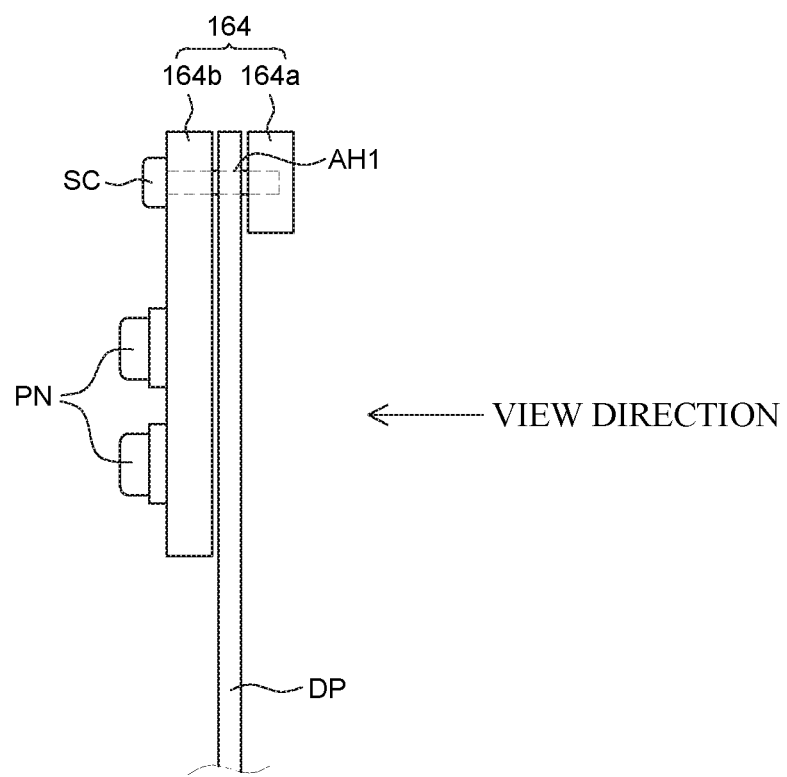
FIG. 3 is a schematic cross-sectional view for explaining a head bar and a display unit of a display device according to an example embodiment of the present disclosure.
Figure 4:
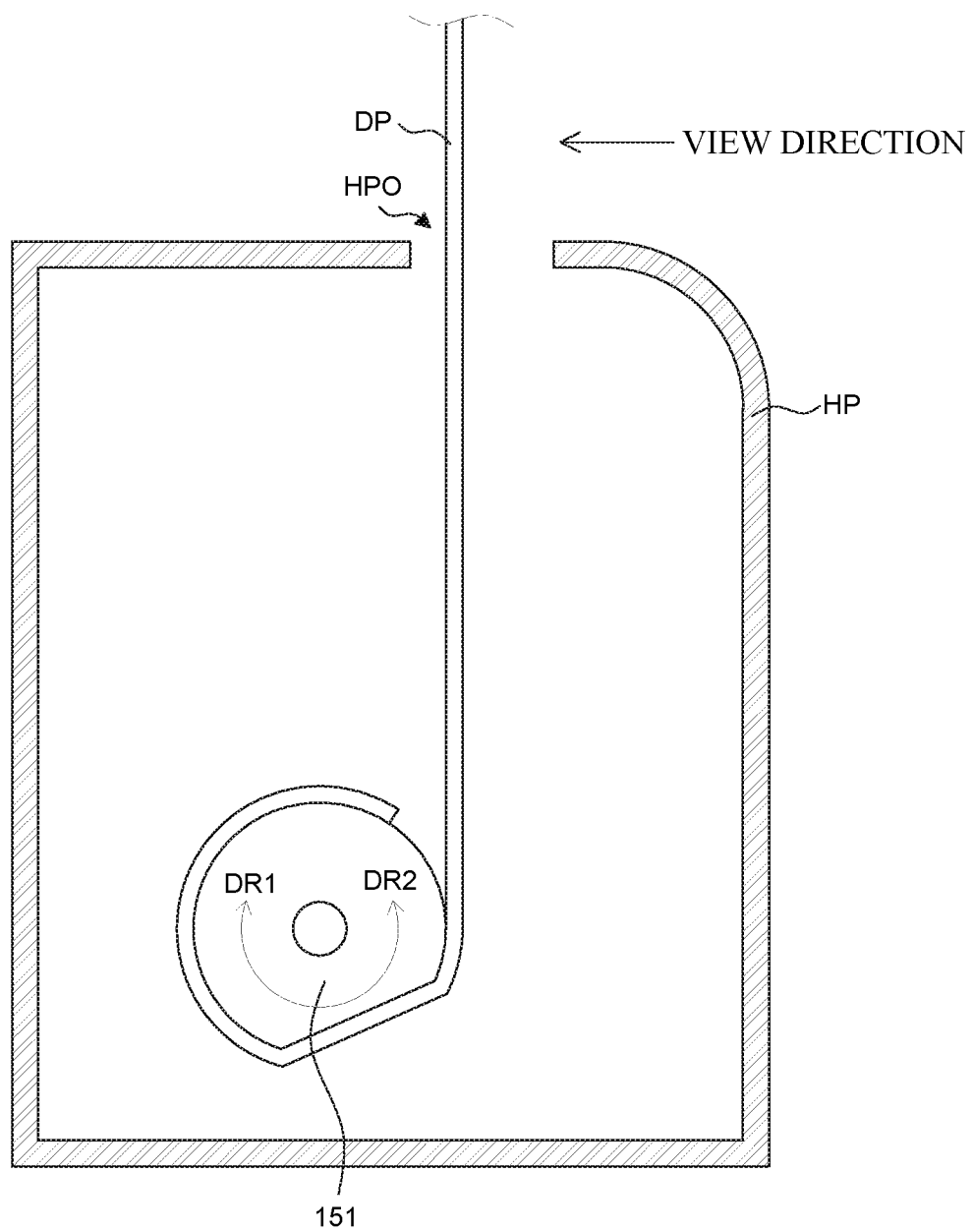
FIG. 4 is a cross-sectional view of a display device according to an example embodiment of the present disclosure.

FIG. 2 is an exploded perspective view of the display device according to an example embodiment of the present disclosure. FIG. 3 is a schematic cross-sectional view provided to explain a head bar and a display unit of the display device according to an example embodiment of the present disclosure. FIG. 4 is a cross-sectional view of the display device according to an example embodiment of the present disclosure. FIG. 4 is a schematic cross-sectional view provided to explain a roller 151 and the display unit DP of the display device 100 according to an example embodiment of the present disclosure. For convenience of description, FIG. 3 illustrates only a head bar 164 and the display unit DP, and FIG. 4 illustrates only the housing unit HP, the roller 151, and the display unit DP.

First, as illustrated in FIG. 2, a driving unit MP may include a roller unit 150 and a lifting unit 160.

The roller unit 150 may wind or unwind the display unit DP fixed to the roller unit 150 while rotating in a first direction DR1 or a second direction DR2. The roller unit 150 may include the roller 151, a roller supporting unit 152, and a roller rotating unit 153.

The roller 151 is a member around which the display unit DP may be wound. The roller 151 may have, e.g., a cylindrical shape. The lower edge of the display unit DP may be fixed to the roller 151. When the roller 151 rotates, the display unit DP whose lower edge is fixed to the roller 151 may be wound around the roller 151. On the other hand, when the roller 151 rotates in the opposite direction, the display unit DP wound around the roller 151 may be unwound from the roller 151.

As shown in FIG. 4, the roller 151 may have a cylindrical shape overall but may be partially flat. That is, a part of the outer peripheral surface of the roller 151 may be flat, and the other part of the outer peripheral surface may be curved. However, the present disclosure is not limited thereto. The roller 151 may have a completely cylindrical shape or may have any shape around which the display unit DP can be wound, but is not limited thereto.

The roller supporting units 152 may support the roller 151 from both sides of the roller 151. Specifically, the roller supporting units 152 may be disposed on a bottom surface HPF of the housing unit HP. Further, upper side surfaces of the respective roller supporting units 152 may be combined with respective ends of the roller 151. Thus, the roller supporting units 152 may support the roller 151 to be spaced apart from the bottom surface HPF of the housing unit HP. Here, the roller 151 may be rotatably combined with the roller supporting units 152.

The roller rotating unit 153 may rotate the roller 151 in the first direction DR1 or the second direction DR2. The roller rotating unit 153 may be disposed on one or each of the pair of roller supporting units 152. For example, the roller rotating unit 153 may be a rotary motor that transfers rotatory power to the roller 151, but is not limited thereto.

The lifting unit 160 may move the display unit DP up and down according to driving of the roller unit 150. The lifting unit 160 may include a link supporting unit 161, a link unit 162, a link lifting unit 163, and the head bar 164.

The link supporting unit 161 may support the link unit 162 and the link lifting unit 163. Specifically, the link supporting unit 161 may support the link unit 162 which may move up and down so that the display unit DP does not collide with the boundary of the opening HPO of the housing unit HP. The link supporting unit 161 may support the link unit 162 and the display unit DP to be movable only up and down without moving in a forward or backward direction.

The link unit 162 may include a plurality of links 162L hinged to each other. The plurality of links 162L may be rotatably hinged to each other respectively and can be moved up and down in a vertical direction by the link lifting unit 163. When the link unit 162 moves up or down in a vertical direction, the plurality of links 162L may rotate in a direction to be farther from or closer to each other. More details thereof will be described below with reference to FIG. 4.

The link lifting unit 163 may move the link unit 162 up or down in the vertical direction. The link lifting unit 163 may rotate the plurality of links 162L of the link unit 162 to be closer to each other or farther away from each other. The link lifting unit 163 may lift or lower the link unit 162 to lift or lower the display unit DP connected to the link unit 162.

In this case, the link lifting unit 163 may be driven in synchronization with the roller rotating unit 153 so that the roller unit 150 and the lifting unit 160 may be driven simultaneously. For example, when the display unit DP is switched from a fully unwound state to a fully wound state, the roller unit 150 may be driven to wind the display unit DP around the roller 151. Concurrently with this, the lifting unit 160 may be driven to rotate the plurality of links 162L of the link unit 162 to lower the display unit DP. Further, when the display unit DP is switched from a fully wound state to a fully unwound state, the roller unit 150 may be driven to unwind the display unit DP from the roller 151. At the same time, the lifting unit 160 may be driven to rotate the plurality of links 162L of the link unit 162 to lift the display unit DP.

The head bar 164 of the lifting unit 160 may be fixed to the uppermost end of the display unit DP. The head bar 164 may be coupled to the link unit 162 and may move the display unit DP up or down in a vertical direction in accordance with the rotation of the plurality of links 162L of the link unit 162. That is, the display unit DP may be moved up or down in a vertical direction by the head bar 164, the link unit 162, and the link lifting unit 163.

As illustrated in FIG. 3, the head bar 164 may be disposed at the uppermost end of the display unit DP to cover a portion of a front surface and a rear surface of the display unit DP.

The head bar 164 may include a first head bar 164a and a second head bar 164b. The first head bar 164a may cover a portion of the front surface of the display unit DP. The first head bar 164a may cover only a part of the front surface adjacent to the uppermost edge of the display unit DP so as not to cover an image displayed on the front surface of the display unit DP.

The second head bar 164b may cover a portion of the rear surface of the display unit DP. The second head bar 164b may cover a part of the rear surface adjacent to the uppermost edge of the display unit DP. Since no image is displayed on the rear surface of the display unit DP, the second head bar 164b may overlap a larger portion of the display unit DP than the first head bar 164a.

To fasten the display unit DP with the first head bar 164a and the second head bar 164b, first fastening holes AH1 may be formed in the display unit DP. Further, screws SC may pass through the first fastening holes AH1 to fasten the first head bar 164a, the display unit DP, and the second head bar 164b together.

The second head bar 164b may include PEM® nuts PN to which the link unit 162 of the lifting unit 160 may be fastened. The second head bar 164b and the link unit 162 of the lifting unit 160 may be fastened with each other by the PEM® nuts PN. Therefore, when the link unit 162 of the lifting unit 160 moves up or down in a vertical direction, the second head bar 164b fastened with the link unit 162 and the first head bar 164a, and the display unit DP fastened with the second head bar 164b may move up or down together in the vertical direction.

FIG. 3 illustrates an example in which the first head bar 164a and the second head bar 164b have a straight-line shape. However, the first head bar 164a and the second head bar 164b may have various other shapes. The shape of the first head bar 164a and the second head bar 164b is not limited to the example illustrated in FIG. 3. For example, the first head bar 164a and the second head bar 164b may have an inverted "L" shape.

Hereinafter, a driving operation of the driving unit MP will be described in detail with reference to FIG. 4.

As shown in FIG. 4, the lower edge of the display unit DP may be coupled to the roller 151. Further, when the roller 151 is rotated by the roller rotating unit 153 (FIG. 2) in a first direction DR1, i.e., a clockwise direction, the display unit DP may be wound around the roller 151 so that the rear surface of the display unit DP can be in close contact with a surface of the roller 151.

On the other hand, when the roller 151 is rotated by the roller rotating unit 153 in a second direction DR2, i.e., a counterclockwise direction, the display unit DP wound around the roller 151 may be unwound from the roller 151 and presented outside the housing unit HP.

In some example embodiments, a driving unit MP having a different structure from the above-described example driving unit MP may be employed in the display device 100. That is, as long as the display unit DP can be wound and unwound, the roller unit 150 and the lifting unit 160 may have different configurations. For example, some of their components described above may be omitted, or other components may be added.

<Display Unit>

Figure 5:
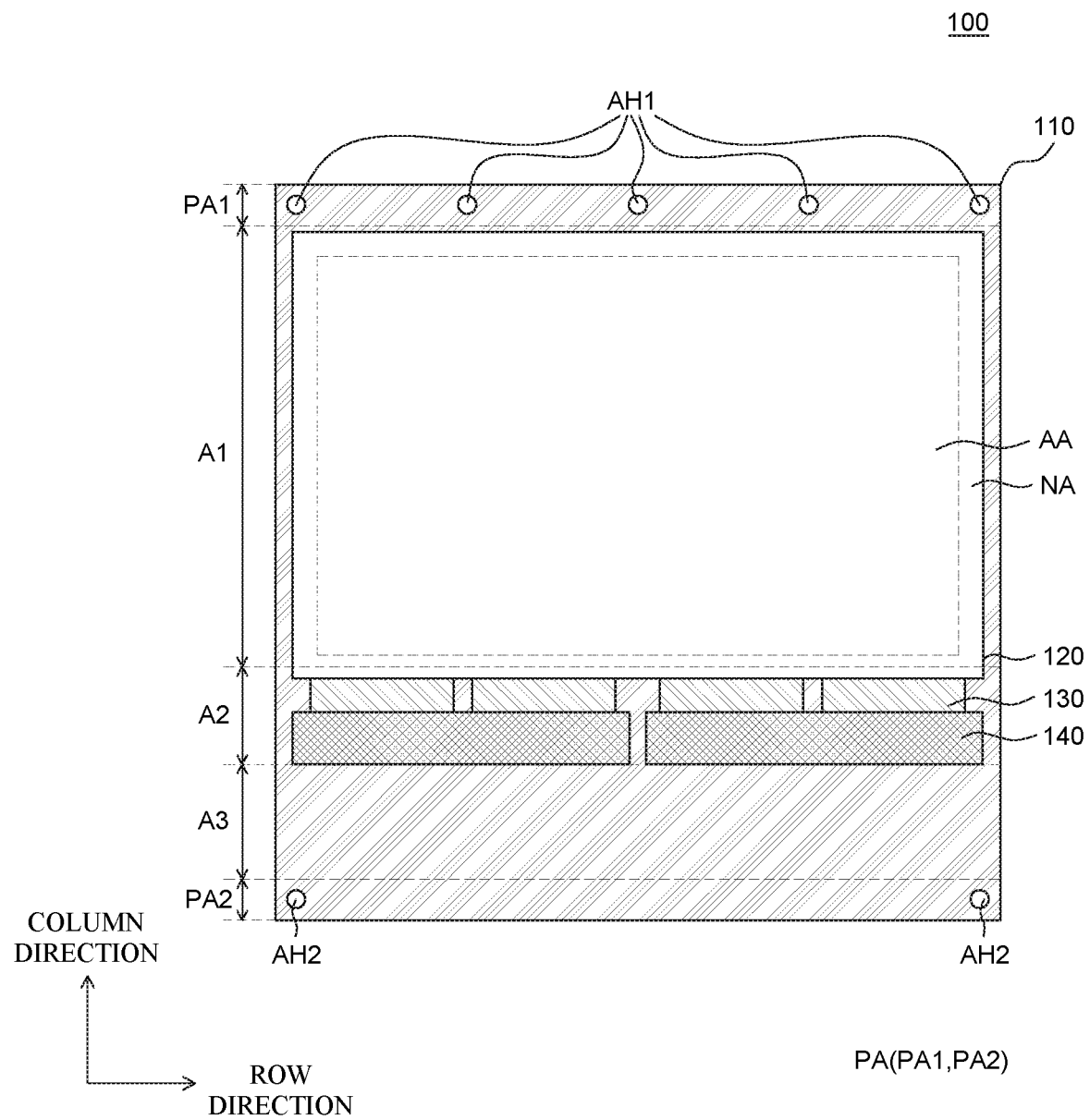
FIG. 5 is a plan view of a display device according to an example embodiment of the present disclosure.
Figure 6:
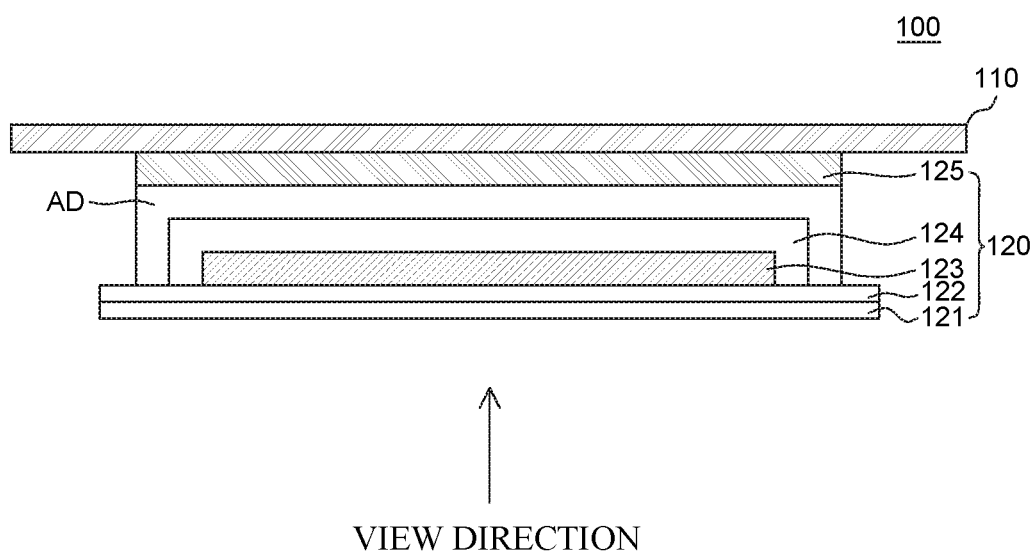
FIG. 6 is a cross-sectional view of a display device according to an example embodiment of the present disclosure.

FIG. 5 is a plan view of a display device according to an example embodiment of the present disclosure. FIG. 6 is a cross-sectional view of a display device according to an example embodiment of the present disclosure. In FIGS. 5 and 6, for the convenience of description, the roller unit 150 and the lifting unit 160 are not illustrated, and only the display unit DP is shown.

As illustrated in FIG. 5, the display unit DP may include a back cover 110, a display panel 120, a flexible film 130, and a printed circuit board 140.

The display panel 120 may be configured to display images to a user. The display panel 120 may include a display element for displaying images, a driving element for driving the display element, and wiring lines for transmitting various signals to the display element and the driving element. A different type of display element may be employed depending on a type of the display panel 120. For example, if the display panel 120 is an organic light emitting display panel, the display element may be an organic light emitting diode having an anode, an organic light emitting layer, and a cathode. As another example, if the display panel 120 is a liquid crystal display panel, the display element may be a liquid crystal display element. Hereinafter, even though the display panel 120 may be described as an organic light emitting display panel, the display panel 120 is not limited to the organic light emitting display panel. Further, since the display device 100 according to an example embodiment of the present disclosure is a rollable display device, the display panel 120 may be implemented as a flexible display panel to be wound around or unwound from the roller 151.

The display panel 120 includes an active area AA and a non-active area NA.

The active area AA is an area where images may be displayed in the display panel 120. In the active area AA, a plurality of sub-pixels and a circuit for driving the plurality of sub-pixels may be disposed. The plurality of sub-pixels may represent the minimum units that configure the active area AA, and a display element may be disposed in each of the plurality of sub-pixels. For example, an organic light emitting diode having an anode, an organic light emitting layer, and a cathode may be disposed in each of the plurality of sub-pixels, but the present disclosure is not limited thereto. Further, a circuit for driving the plurality of sub-pixels may include, without limitation, a driving element and a wiring line. For example, the circuit may include such elements as a thin film transistor (TFT), a storage capacitor, a gate line, and a data line, but is not limited thereto.

The non-active area NA of the display panel 120 is an area where no image is to be displayed. In the non-active area NA, various wiring lines, circuits, and other components for driving the organic light emitting diodes of the active area AA may be disposed. For example, in the non-active area NA, link lines for transmitting signals to the plurality of sub-pixels and circuits in the active area AA or a driving IC, such as a gate driver IC, a data driver IC, and other similar driver ICs, may be disposed. However, the non-active area of the present disclosure is not limited thereto.

The flexible films 130 may include various components on flexible base films and may supply signals to the plurality of sub-pixels and the circuits in the active area AA. The flexible films 130 may be electrically connected to the display panel 120. The flexible films 130 may be disposed at one end of the non-active area NA of the display panel 120 and may supply a power voltage, a data voltage, or other voltages or signals to the plurality of sub-pixels and the circuits in the active area AA. The number of flexible films 130 illustrated in FIG. 5 is merely an example. The number of flexible films 130 is not limited to the illustrated example and may vary depending on the design.

For example, a driving IC, such as a gate driver IC or a data driver IC, may be disposed on the flexible films 130. The driving IC may be configured to process data for displaying images and a driving signal for processing the data. The driving IC may be disposed via a chip on glass (COG), a chip on film (COF), or a tape carrier package (TCP) technique, depending on a mounting method. For the convenience of description, the driving IC may be described, for example, as being mounted on the flexible film 130 by a chip on film (COF) technique, but is not limited thereto.

The printed circuit boards 140 may be disposed at one ends of the flexible films 130 and connected to the flexible films 130. The printed circuit boards 140 may be configured to supply signals to the driving IC. For example, the printed circuit boards 140 may supply various signals, such as a driving signal or a data signal, to the driving IC. Various components may be disposed on the printed circuit boards 140. For example, a timing controller and a power source unit, among others, may be disposed on the printed circuit boards 140. Even though FIG. 5 illustrates two printed circuit boards 140 as an example, the number of printed circuit boards 140 is not limited to the illustrated example and may vary depending on the design.

Even though not illustrated in FIG. 5, one or more additional printed circuit boards connected to the printed circuit boards 140 may be further disposed. For example, the printed circuit boards 140 may be referred to as source printed circuit boards S-PCB on which the data driver is mounted. An additional printed circuit board connected to the printed circuit boards 140 may be referred to as a control printed circuit board C-PCB on which the timing controller may be mounted. The additional printed circuit boards may be disposed inside the roller 151, or may be disposed within the housing unit HP outside the roller 151.

As shown in FIG. 6, the display panel 120 may include a substrate 121, a buffer layer 122, a pixel unit 123, an encapsulating layer 124, and an encapsulating substrate 125.

The substrate 121 may serve as a base member for supporting various components of the display panel 120 and may be formed of an insulating material. The substrate 121 may be formed of a flexible material to allow the display panel 120 to be wound or unwound. For example, the substrate 121 may be formed of a plastic material, such as polyimide (PI).

The buffer layer 122 may suppress diffusion of moisture and/or oxygen permeating from the outside of the substrate 121. The buffer layer 122 may be formed as a single layer or a multi-layer of silicon oxide (SiOx) and silicon nitride (SiNx), but is not limited thereto.

The pixel unit 123 may include a plurality of organic light emitting diodes and a circuit for driving the plurality of organic light emitting diodes. The pixel unit 123 may be disposed in an area corresponding to the active area AA. Each organic light emitting diode may include an anode, an organic light emitting layer, and a cathode.

The anode may supply holes to the organic light emitting layer and be formed of a conductive material having a high work function. For example, the anode may be formed of tin oxide (TO), indium tin oxide (ITO), indium zinc oxide (IZO), indium zinc tin oxide (ITZO), or the like, but is not limited thereto.

The organic light emitting layer may be supplied with holes from the anode and with electrons from the cathode to emit light. The organic light emitting layer may be one of a red organic light emitting layer, a green organic light emitting layer, a blue organic light emitting layer, and a white organic light emitting layer depending on a color of light emitted from the organic light emitting layer. In this case, if the organic light emitting layer is a white organic light emitting layer, color filters having various colors may be additionally employed.

The cathode may supply electrons to the organic light emitting layer and may be formed of a conductive material having a low work function. For example, the cathode may be formed of any one or more materials selected from a group of metals, such as magnesium (Mg), silver (Ag), and aluminum (Al), and an alloy thereof, but is not limited thereto.

The display panel 120 may be configured as a top emission type or a bottom emission type, depending on an emission direction of light emitted from the organic light emitting diode.

In the top emission type, light emitted from the organic light emitting diode is emitted away from the substrate 121 on which the organic light emitting diode is formed. If the display panel 120 is of the top emission type, a reflective layer may be further provided below the anode to allow the light emitted from the organic light emitting diode to travel away from the substrate 121, i.e., toward the cathode.

In the bottom emission type, light emitted from the organic light emitting diode is emitted toward the substrate 121 on which the organic light emitting diode is formed. If the display panel 120 is of the bottom emission type, the anode may be formed of a transparent conductive material only to allow the light emitted from the organic light emitting diode to travel toward and through the substrate 121, and the cathode may be formed of a metal material having a high reflectivity.

Hereinafter, for the convenience of description, the display device 100 according to an example embodiment of the present disclosure will be described as a bottom emission type display device, but it is not limited thereto.

A circuit for driving the organic light emitting diode may be disposed in the pixel unit 123. The circuit may include, without limitation, a thin film transistor (TFT), a storage capacitor, a gate line, a data line, a power line. The components of the circuit may vary depending on the design of the display device 100.

The encapsulating layer 124 may be disposed on and cover the pixel unit 123. The encapsulating layer 124 may closely seal the organic light emitting diode of the pixel unit 123. The encapsulating layer 124 may protect the organic light emitting diode of the pixel unit 123 from external moisture, oxygen, impacts, and the like. The encapsulating layer 124 may be formed by alternately laminating a plurality of inorganic layers and a plurality of organic layers. For example, the inorganic layers may be formed of an inorganic material, such as silicon nitride (SiNx), silicon oxide (SiOx), and aluminum oxide (AlOx), but are not limited thereto. For example, the organic layers may be formed of epoxy or acrylic based polymer, but are not limited thereto.

The encapsulating substrate 125 may be disposed on the encapsulating layer 124. The encapsulating substrate 125 may protect the organic light emitting diodes of the pixel unit 123 together with the encapsulating layer 124. The encapsulating substrate 125 may protect the organic light emitting diodes of the pixel unit 123 from external moisture, oxygen, impacts, and the like. The encapsulating substrate 125 may be formed of a metal material, which has a high corrosion resistance and can be easily processed in the form of a foil or a thin film. Examples of such metal material include, without limitation, aluminum (Al), nickel (Ni), chromium (Cr), and an alloy material of iron (Fe) and nickel. Therefore, as the encapsulating substrate 125 may be formed of a metal material, the encapsulating substrate 125 may be implemented as an ultra-thin film and may provide a strong resistance against external impacts and scratches.

An adhesive member AD may be disposed between the encapsulating layer 124 and the encapsulating substrate 125. The adhesive member AD may bond the encapsulating layer 124 and the encapsulating substrate 125 to each other. The adhesive member AD may be formed of a material having adhesiveness and may be a thermosetting or naturally-curable type adhesive. For example, the adhesive member AD may be formed of an optical clear adhesive (OCA), a pressure sensitive adhesive (PSA), or the like, but is not limited thereto.

The adhesive member AD may be disposed to cover or enclose the encapsulating layer 124 and the pixel unit 123. That is, the pixel unit 123 may be sealed by the buffer layer 122 and the encapsulating layer 124, and the encapsulating layer 124 and the pixel unit 123 may be sealed by the buffer layer 122 and the adhesive member AD. The adhesive member AD may protect the organic light emitting diodes of the pixel unit 123 from external moisture, oxygen, impacts, and the like together with the encapsulating layer 124 and the encapsulating substrate 125. In this case, the adhesive member AD may further include an absorbent. The absorbent may be hygroscopic particles and may absorb moisture and oxygen from the outside to minimize permeation of moisture and oxygen into the pixel unit 123.

The back cover 110 may be disposed on rear surfaces of the display panel 120, the flexible film 130, and the printed circuit board 140 to support the display panel 120, the flexible film 130, and the printed circuit board 140. The back cover 110 may be disposed to be in contact with the encapsulating substrate 125 of the display panel 120 to protect the display panel 120. Therefore, a size of the back cover 110 may be larger than a size of the display panel 120. That is, both lateral edges of the back cover 110 may protrude beyond the respective lateral edges of the corresponding display panel 120. Therefore, when the display unit DP is disposed outside of the housing unit HP, the back cover 110 may protect the display unit DP, more specifically, the display panel 120, from the external impact.

The back cover 110 may include a magnetic material. For example, the back cover 110 may include or be formed of a ferromagnetic material, ferrimagnetic material, a transition metal, such as iron (Fe), cobalt (Co), or nickel (Ni), oxide including a transition metal, and a metal compound including rare-earth atoms, such as neodymium (Nd) or samarium (Sm), but is not limited thereto. Further, the back cover 110 may include or be formed of a magnetic material having a lower modulus than that of the metal material.

Further, as the back cover 110 may include a magnetic material, the back cover 110 may be manufactured to be thin. For example, a thickness of the back cover 110 may be 100 μm or smaller, but is not limited thereto.

Since the back cover 110 may include a magnetic material, the back cover 110 may be attached to the encapsulating substrate 125 of the display panel 110. That is, since the encapsulating substrate 125 may be formed of a metal material, the back cover 110 including a magnetic material may be more easily and more securely attachable to and detachable from the encapsulating substrate 125.

Even though not illustrated in FIG. 6, a light-transmissive film may be further disposed on a front surface (the lower surface as shown in FIG. 6) of the substrate 121. The light-transmissive film may perform a function of protecting a front surface of the display panel 120 or minimizing the reflection of external light incident onto the display panel 120. For example, the light-transmissive film may be at least one of polyethyleneterephthalate (PET) film, an anti-reflection film, a polarizer film, and a transmittance controllable film, but is not limited thereto.

As shown in FIG. 5, the display unit DP of the display device 100 may include a first supporting area PA1, a second supporting area PA2, a first area A1, a second area A2, and a third area A3. Specifically, the first supporting area PA1, the first area A1, the second area A2, the third area A3, and the second supporting area PA2 may be sequentially defined from the uppermost end to the lowermost end of the display unit DP of the display device 100.

An uppermost area of the back cover 110 disposed in the first supporting area PA1 may be fastened with the head bar 164. That is, first fastening holes AH1 to be fastened with the head bar 164 may be formed in the back cover 110 in the first supporting area PA1. Further, as described above in detail with reference to FIG. 3, screws SC passing through the head bar 164 and the first fastening holes AH1 may be disposed to fasten the head bar 164 with the back cover 110 in the first supporting area. Further, as the back cover 110 in the first supporting area PA1 is fastened with the head bar 164, when the link unit 162 fastened with the head bar 164 is lifted or lowered, the back cover 110 and the display panel 120 attached to the back cover may also be lifted or lowered together with the head bar 164. Even though five first fastening holes AH1 are illustrated in FIG. 5 as an example, the number of first fastening holes AH1 is not limited to the illustrated example. Further, even though the back cover 110 is described as being fastened with the head bar 164 using the first fastening holes AH1 in FIG. 5 as an example, the present disclosure is not limited thereto. For example, the back cover 110 and the head bar 164 may be fixed with each other without the use of a separate fastening hole.

The first area A1 of the display unit DP may be an area extending from the first supporting area PA1 toward the lower end of the display unit DP. The first area A1 may overlap the display panel 120. That is, the first area A1 may be an area to which the display panel 120 is attached. In this case, as illustrated in FIG. 5, the first area A1 may be defined as an area that overlaps the display panel 120 but not the flexible films 130. Alternatively, the first area A1 may be defined as an area that overlaps the entire display panel 120 regardless of whether it also overlaps the flexible films 130.

The second area A2 may be an area extending from the first area A1 toward the lower end of the display unit DP. That is, the second area A2 may be spaced apart from the first supporting area PA1 with the first area A1 therebetween. In the second area A2, the flexible films 130 connected to one end of the display panel 120 and printed circuit boards 140 may be disposed.

To protect the flexible films 130 and the printed circuit boards 140, the second area A2 may be configured to allow the flexible films 130 and the printed circuit boards 140 to be wound around the roller 151 (see, e.g., FIG. 4) in a planar shape, rather than a curved shape. Further, a part of the roller 151 corresponding to the second area A2 in a wound state may be formed to be flat. A detailed description thereof will be made below with reference to FIGS. 7A to 7C.

The third area A3 may be an area extending from the second area A2 toward the lower end of the display unit DP. That is, the third area A3 may be spaced apart from the first supporting area PA1 with the first area A1 and the second area A2 therebetween. In an unwound state, the third area A3 may serve as an extension to present the active area AA of the display panel 120 outside the housing unit HP and therefore viewable to the user. For example, when the back cover 110 and the display panel 120 are fully unwound, the second supporting area PA2, which may be fixed to the roller 151, and the second area A2, to which the flexible film 130 and the printed circuit board 140 may be attached, may be disposed in the housing unit HP. In that fully unwound state, the first area A1 to which the display panel 120 is attached may be disposed outside the housing unit HP. In this case, if a length from the second supporting area PA2 fixed to the roller 151 to the upper end of the second area A2 is smaller than a distance from the second supporting area PA2 to the opening HPO of the housing unit HP, a part of the first area A1 to which the display panel 120 is attached may remain disposed in the housing unit HP. Then, a part of the lower end of the active area AA of the display panel 120 may remain disposed in the housing unit HP, and the user may not be able to view a full image displayed on the display panel 120. Therefore, the length from the second supporting area PA2 fixed to the roller 151 to the upper end of the second area A2 may be designed to be equal to or greater than the distance from the second supporting area PA2 fixed to the roller 151 to the opening HPO of the housing unit HP.

The second supporting area PA2 may be the lowermost area of the display unit DP of the display device 100 and may be fastened with the roller 151. That is, second fastening holes AH2 may be formed in the back cover 110 in the second supporting area PA2 to be fastened with the roller 151. For example, screws SC which pass through the roller 151 and the second fastening holes AH2 may fasten the roller 151 and the back cover 110 in the second supporting area PA2 with each other. Further, as the back cover 110 in the second supporting area PA2 is fastened with the roller 151, the back cover 110 may be wound around or unwound from the roller 151 by the rotation of the roller 151. Even though two second fastening holes AH2 are illustrated in FIG. 5 as an example, the number of second fastening holes AH2 is not limited to the illustrated example. Further, even though the back cover 110 is described as being fastened with the roller 151 using the second fastening holes AH2 in FIG. 5 as an example, the present disclosure is not limited thereto. For example, the back cover 110 and the roller 151 may be fastened with each other without the use of a separate fastening hole.

<Winding Process of Display Device>

Figure 7A:
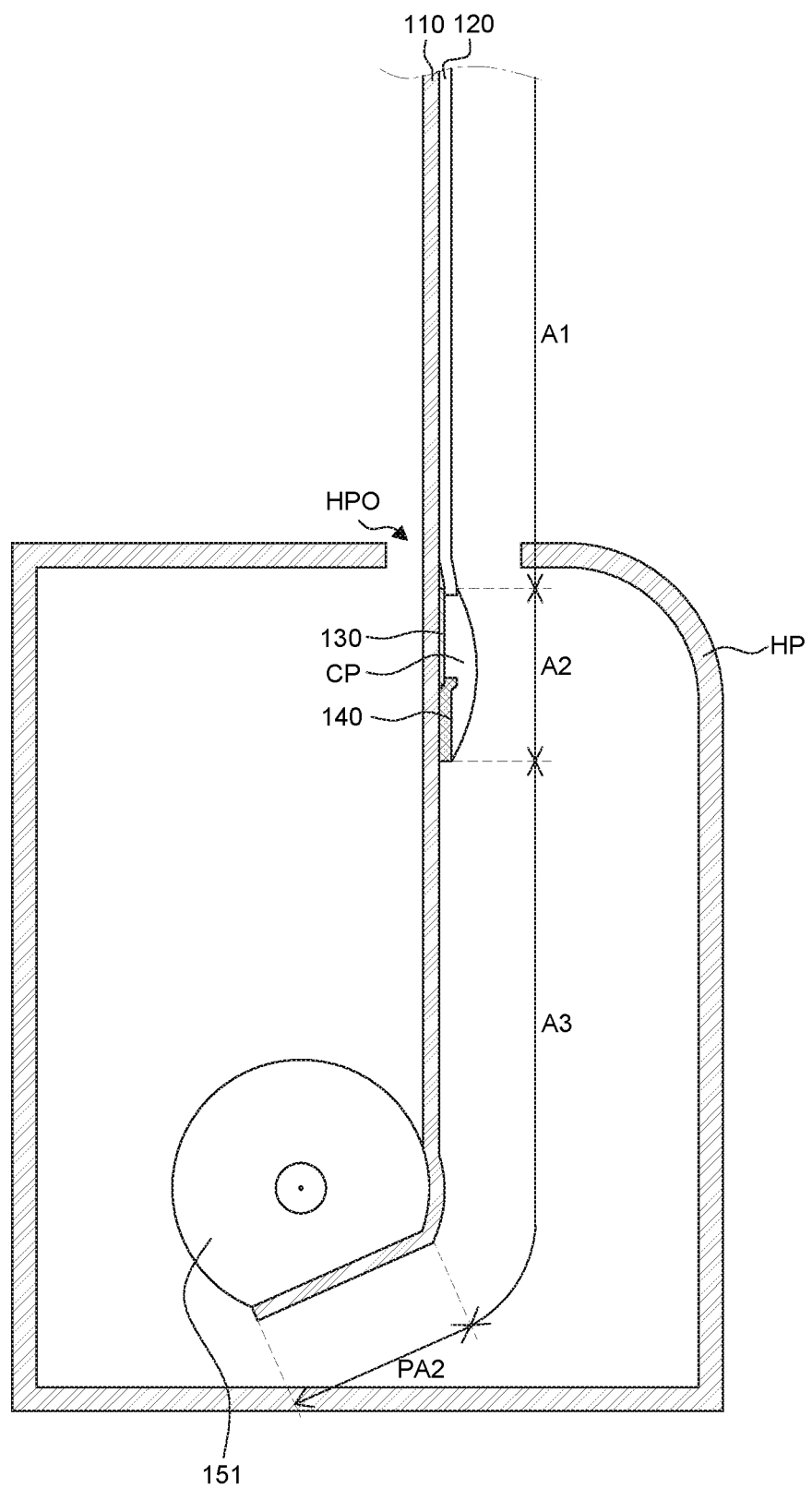
FIGS. 7A to 7C are cross-sectional views of a display device according to an example embodiment of the present disclosure.
Figure 7B:
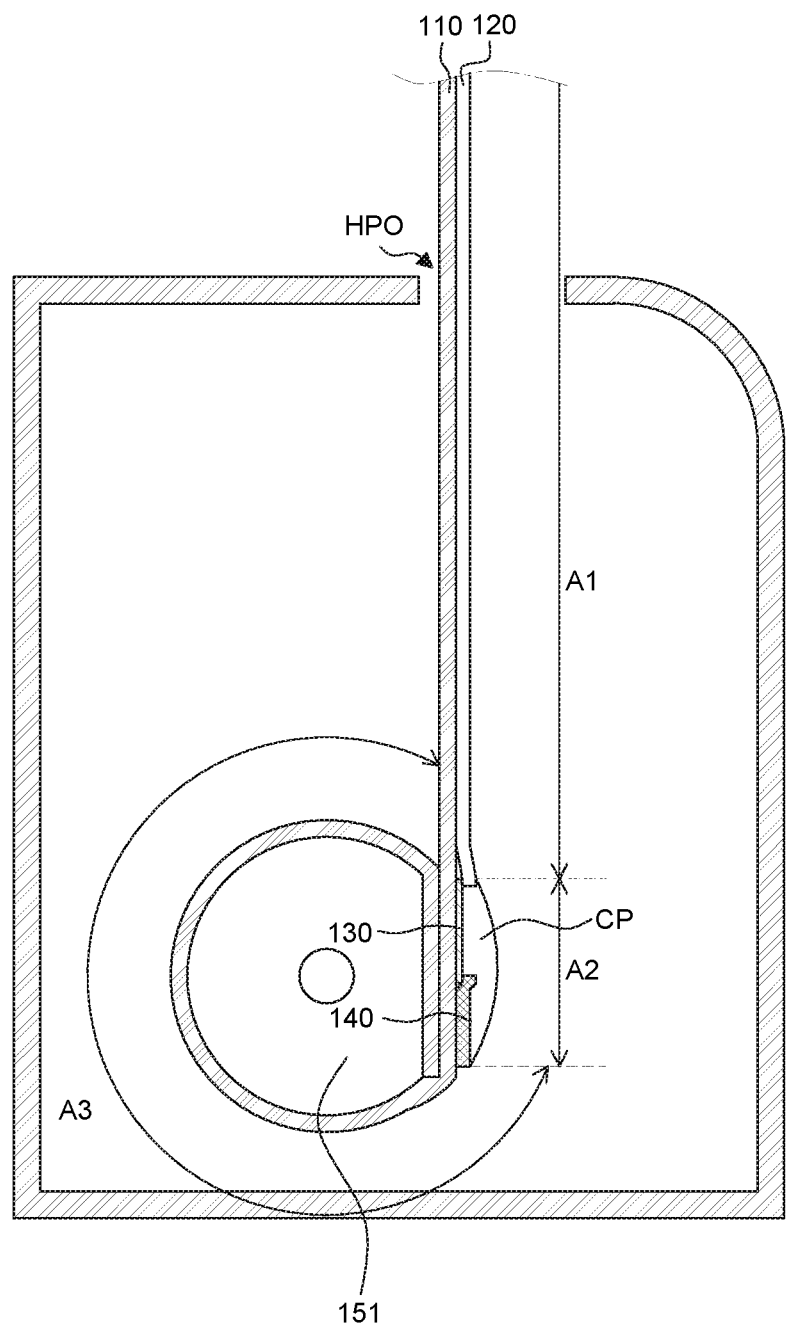
Figure 7C:
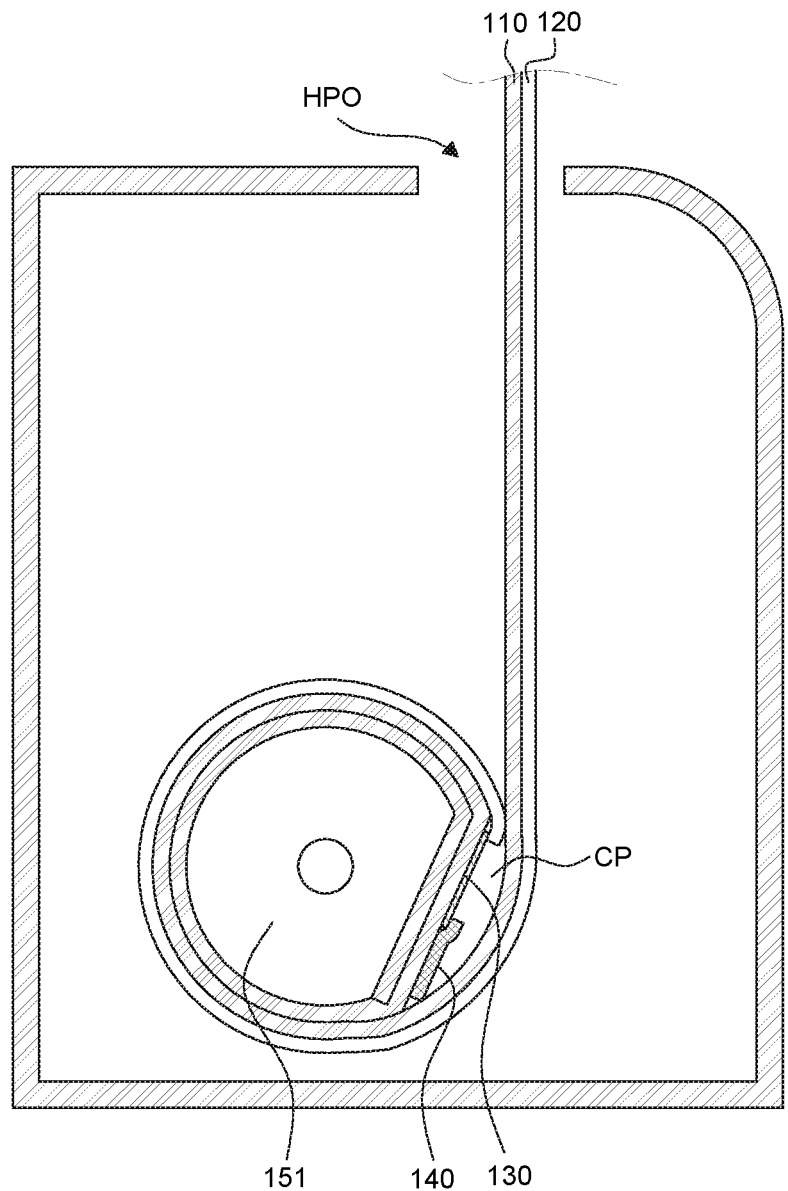

FIGS. 7A to 7C are cross-sectional views of a display device according to an example embodiment of the present disclosure. FIG. 7A is a cross-sectional view of the display device with the back cover 110 fully unwound from the roller 151. FIG. 7B is a cross-sectional view of the display device with the back cover 110 in the second supporting area PA2, the third area A3, and the second area A2 wound around the roller 151. FIG. 7C is a cross-sectional view of the display device with the back cover 110 in the second supporting area PA2, the third area A3, the second area A2, and the first area A1, and the display panel 120 wound around the roller 151.

As shown in FIG. 7A, the roller 151 may have a cylindrical shape overall but may be partially flat. That is, a part of an outer circumferential surface of the roller 151 may be flat, and the remaining part of the outer circumferential surface may be curved.

The back cover 110 in the second supporting area PA2 may be fastened with the flat portion of the roller 151. Except for the second supporting area PA2 fastened with the roller 151, the remaining portion of the back cover 110 extending from the second supporting area PA2 may be substantially flat.

A cover unit CP may be further disposed on the flexible films 130 and the printed circuit boards 140 disposed in the second area A2. The cover unit CP may be disposed to cover the flexible films 130 and the printed circuit boards 140, and may have a convex shape. The cover unit CP may protect the flexible films 130 and the printed circuit boards 140, and may be formed of an insulating material, such as a resin, but is not limited thereto. Further, although the cover unit CP is illustrated in FIGS. 7A to 7C as an example, the present disclosure is not limited thereto. Various other types of mechanical components may be employed to protect the flexible films 130 and the printed circuit boards 140 and to fix the flexible films 130 and the printed circuit boards 140 to the back cover 110.

When the back cover 110 is fully unwound, the back cover 110 in the third area A3 and the second area A2 may be disposed in the housing unit HP, and the back cover 110 in the first area A1 may be disposed outside the housing unit HP.

Next, as illustrated in FIG. 7B, the back cover 110 in the second supporting area PA2, the third area A3, and the second area A2 may be wound around the roller 151, and the back cover 110 in the first area A1 extending from the first area A2 may be unwound.

In this state, the back cover 110 in the second supporting area PA2 and the second area A2 are disposed on the flat portion of the outer circumferential surface of the roller 151, and the back cover 110 in the third area A2 may be disposed on a curved portion of the roller 151.

The back cover 110 in the second area A2 in which the printed circuit boards 140 and the flexible films 130 are disposed may be wound around the roller 151 and positioned on the flat portion of the roller 151 so that the back cover 110 in the second area A2 and the printed circuit boards 140 and the flexible films 130 disposed in the second area A2 may maintain a flat state without being bent. Therefore, the flexible films 130 and the printed circuit boards 140 may always maintain a flat state regardless of the winding or unwinding of the display unit DP, and potential damages caused by the flexible films 130 and the printed circuit boards 140 being bent may be suppressed or prevented.

FIG. 7C shows a state in which the back cover 110 in the second supporting area PA2, the third area A3, and the second area A2 is wound around the roller 151. In this state, a part of the back cover 110 in the first area A1 may further be wound around the roller 151.

The part of the back cover 110 in the first area A1 may be wound to overlap a curved portion of the roller 151. That is, the part of the back cover 110 in the first area A1 may be wound along the curved shape of the roller 151 on the back cover 110 in the third area A3, which is wound on the curved portion of the roller 151.

The other part of the back cover 110 in the first area A1 may be wound to overlap a flat portion of the roller 151. In other words, this part of the back cover 110 in the first area A1 may be wound and disposed on the back cover 110 in the second area A2, which is wound and disposed on the back cover 110 in the second supporting area PA2 fixed to the flat portion of the roller 151.

Specifically, the first area A1 may be wound around the roller 151 to cover the second area A2. In this case, the cover unit CP may be disposed between the first area A1 and the second area A2. Therefore, the first area A1 may be wound to cover the cover unit CP disposed in the second area A2 and be bent along the outer shape of the cover unit CP. The cover unit CP may have a curved outer surface so that the first area A1 may be bent along the curved surface. Specifically, the curved outer surface of the cover unit CP may have a shape corresponding to the curved portion of the roller 151 so that a cross-section of the back cover 110 in the first area A1 wound around the roller 151 may have a substantially circular shape.

In rollable display devices, the thicknesses of all components may be reduced to reduce or minimize the stress generated during the winding and unwinding. As the layers forming the display panel may be manufactured to be thin, the back cover may be provided to support and protect the display panel. The back cover used in the rollable display devices may be formed of a material having a high rigidity, such as a metal material. Further, a separate adhesive layer may be employed to bond the back cover to the display panel.

As described above, the back cover may be employed to support and protect the display panel, but the thicknesses of the back cover and the adhesive layer may be large. For example, the combined thickness may be approximately 400 to 500 μm, which would account for a large proportion of the overall thickness of the entire display panel. Further, if the back cover is formed of a metal material, the stress generated during the winding or unwinding may be large. Therefore, the display panel may crack due to the stress generated when the display device is repeatedly wound or unwound.

Therefore, in the display device 100 according to an example embodiment of the present disclosure, the back cover 110 may include or be formed of a magnetic material and may be manufactured to be thin. Specifically, if the back cover 110 is formed of a magnetic material, the back cover 110 may be employed with a smaller thickness than that of the back cover formed of a metal material. Further, if the back cover 110 is formed of a magnetic material, the back cover 110 may be attached to the encapsulating substrate 125 of the display panel 120 without the use of a separate adhesive layer. Therefore, in the display device 100 according to an example embodiment of the present disclosure, the back cover 110 including a magnetic material may be employed to reduce a total thickness of the display unit DP, thereby reducing a stress generated during the winding and unwinding.

Further, in the display device 100 according to an example embodiment of the present disclosure, the back cover 110 may include or be formed of a magnetic material having a lower modulus than the metal material. As described above, if the back cover 110 is formed of a magnetic material having a low modulus, the stress generated during winding or unwinding may be minimized or suppressed, thus reducing the probability of damage to the display device 100.

Further, in the display device 100 according to an example embodiment of the present disclosure, the back cover 110 in the second area A2 may always be maintained flat so that potential damages to the flexible films 130 and the printed circuit boards 140 attached to the second area A2 may be minimized. The back cover 110 in the second area A2 may be an area to which the flexible films 130 and the printed circuit boards 140 are attached and which may always be maintained flat. Specifically, when the back cover 110 is wound around the roller 151, the back cover 110 may be wound while being bent along the outer shape of the roller 151. Therefore, in the display device 100 according to an example embodiment of the present disclosure, a part of the roller 151 around which the back cover 110 in the second area A2 is wound may be formed to be flat so that the back cover 110 in the second are A2 may be wound around the roller 151 to be flat. Even though the back cover 110 in the second area A2 is wound around the roller 151, the second area A2 may always maintain a flat state so that the flexible films 130 and the printed circuit boards 140 attached to the second area A2 may also maintain a flat state. For example, when the display unit DP is fully unwound, the flexible film 130 and the printed circuit board 140 may maintain the flat state by the back cover 110 in the second area A2 having a high rigidity. On the other hand, when the display unit DP is fully wound, the flexible film 130 and the printed circuit board 140 are positioned on a flat portion of the roller 151 to maintain the flat state. Therefore, in the display device 100 according to an example embodiment of the present disclosure, the flexible films 130 and the printed circuit boards 140 may remain flat without repeatedly being bent so that potential damages to the flexible films 130 and the printed circuit boards 140 may be minimized or suppressed.

<Back Cover Including Magnetic Material Particles Dispersed in Resin>

Figure 8:
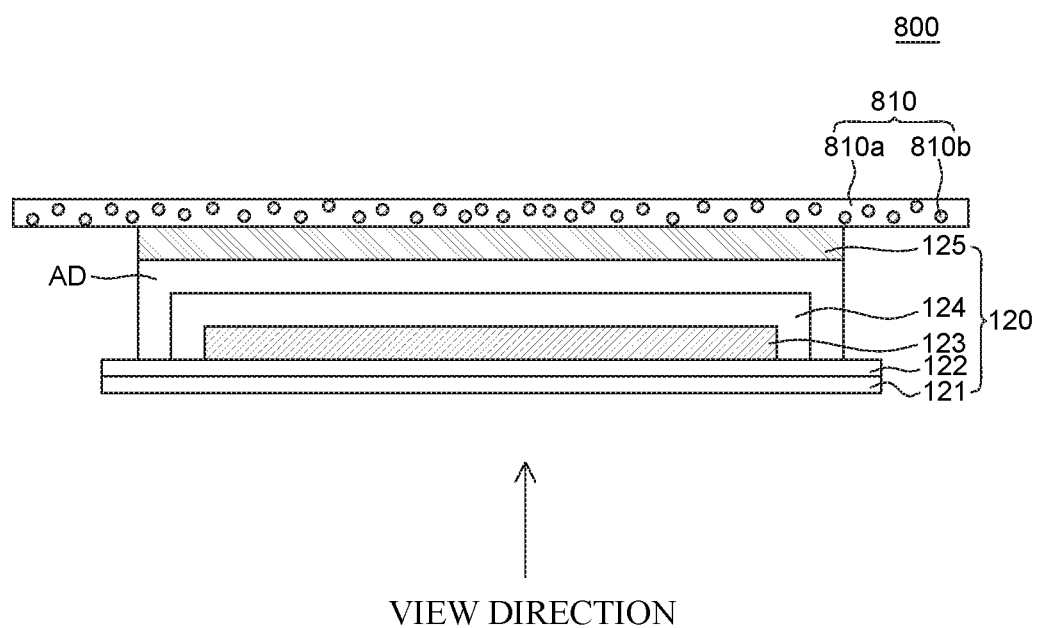
FIG. 8 is a cross-sectional view of a display device according to another example embodiment of the present disclosure.

FIG. 8 is a cross-sectional view of a display device according to another example embodiment of the present disclosure. The only substantial difference between a display device 800 of FIG. 8 and the example display device 100 of FIGS. 1 to 7C may be a back cover 810. Otherwise, the display device 800 may have substantially the same configuration as the display device 100 of FIGS. 1 to 7C so that a redundant description of the same or similar components may be omitted. In FIG. 8, for the convenience of description, among various components of the display device 800, only the display panel 120 and the back cover 810 are illustrated.

As illustrated in FIG. 8, the back cover 810 may include a resin 810a and a plurality of magnetic material particles 810b dispersed in the resin 810a.

The resin 810a may be formed of various resin materials, for example, a silicon resin, but is not limited thereto. Further, the plurality of magnetic material particles 810b may be substantially the same material as a magnetic material forming or included in the example back cover 110 described with reference to FIGS. 1 to 7C. That is, the plurality of magnetic material particles 810b may be obtained by manufacturing the magnetic material in particulate forms.

For example, the back cover 810 may be formed by coating and curing the resin 810a including a plurality of magnetic material particles 810b on the encapsulating substrate 125. As another example, the back cover 810 may be formed by forming a resin 810a including a plurality of magnetic material particles 810b as a film and then attaching the film with the encapsulating substrate 125. However, a manufacturing method of the back cover 810 is not limited to the above examples.

In the display device 800 according to an example embodiment of the present disclosure, the back cover 810 may include or be formed of a resin 810a including a plurality of magnetic material particles 810b to improve a rolling property of the display device 800. The back cover may generally be formed of a material having a relatively high modulus, such as a metal material or a plastic material, so that when the back cover is wound or unwound, much stress may be generated in the back cover. Therefore, plastic deformation may occur in the back cover, and the back cover may be damaged. Further, if the back cover is damaged, the display panel may also be damaged. In the display device 800 according to an example embodiment of the present disclosure, a back cover 810 using a resin 810a having a relatively low modulus as a base material may be employed so that the stress generated in the back cover 810 during the winding and unwinding of the back cover 810 may be reduced. Therefore, potential damages of the back cover 810 and the display panel 120 may be reduced.

<Protective Layer Disposed on a Back Cover>

Figure 9:
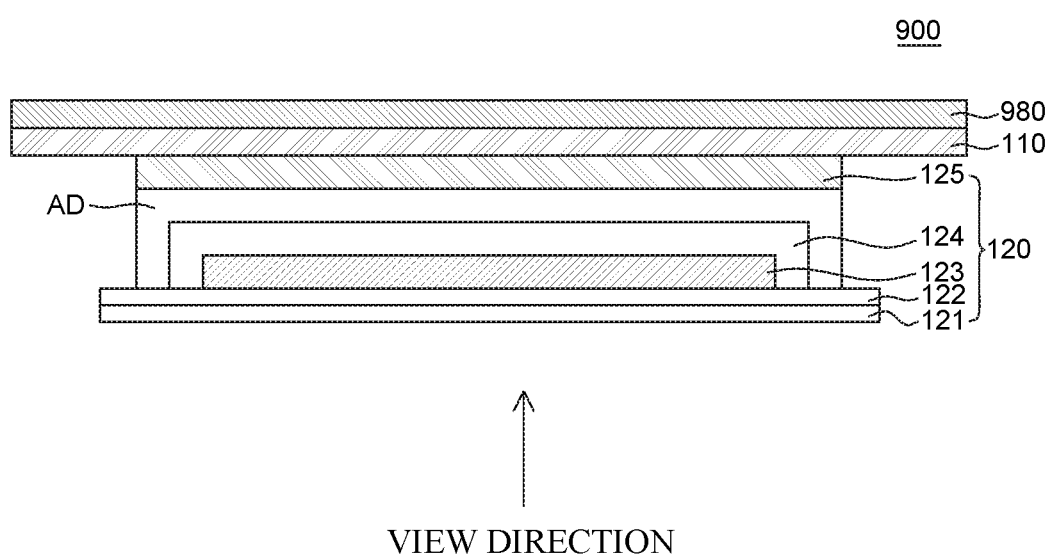
FIG. 9 is a cross-sectional view of a display device according to still another example embodiment of the present disclosure.

FIG. 9 is a cross-sectional view of a display device according to still another example embodiment of the present disclosure. A display device 900 of FIG. 9 may have substantially the same configuration as the example display device 100 of FIGS. 1 to 7C, except for the addition of a protective layer 980. Thus, a redundant description of the same or similar components may be omitted. In FIG. 9, for the convenience of description, among various components of the display device 900, only the display panel 120, the back cover 110, and the protective layer 980 are illustrated.

As shown in FIG. 9, a protective layer 980 may be disposed on the back cover 110. That is, the display panel 120 may be attached to one surface of the back cover 110, and the protective layer 980 may be disposed on the opposite surface of the back cover 110.

The protective layer 980 may be disposed to correspond to an area of the display device 900 in which the back cover 110 is disposed. That is, the protective layer 980 may have the same size as the back cover 110 to overlap the entire back cover 110. However, the protective layer 980 is not limited thereto. For example, the protective layer 980 may be larger than the back cover 110 or may be formed to protrude outwardly from the back cover 110. In this case, the protective layer 980 may suppress potential deformation of the outer edges of the back cover 110 that may be caused by an external impact and may also suppress a possible injury to the user that may be caused by the edges of the back cover 110.

The protective layer 980 may be formed of an insulating material having a low modulus. For example, the protective layer 980 may be formed of various resin materials, such as a silicon resin or the like, but is not limited thereto.

In the display device 900 according to an example embodiment of the present disclosure, the protective layer 980 may be disposed on a surface of the back cover 110 opposite to the display panel 120 to reduce a potential interference of the back cover 110 with respect to the display panel 120. Specifically, when the back cover 110 and the display panel 120 are wound, the back cover 110 may interfere with the display panel 120. That is, during the process of winding the back cover 110 and the display panel 120 by the roller 151, the display panel 120 may be wound on the back cover 110 and be in direct contact with the back cover 110. In this case, if the back cover 110 is formed of a material having high rigidity, a front surface or the viewing surface of the display panel 120, specifically a substrate 121 or a polarizer film disposed on the substrate 121, may be scratched or damaged by the back cover 110. Therefore, in the display device 900 according to an example embodiment of the present disclosure, the protective layer 980 may be disposed to cover the rear surface of the back cover 110. When wound, the back cover 110 and the display panel 120 may not be in direct contact with each other, with the protective layer 980 being disposed between the back cover 110 and the display panel 120. As a result, potential damages to the display panel 120 that may otherwise be caused by the interference between the back cover 110 and the display panel 120 may be minimized or prevented.

<Shielding Layer>

Figure 10:
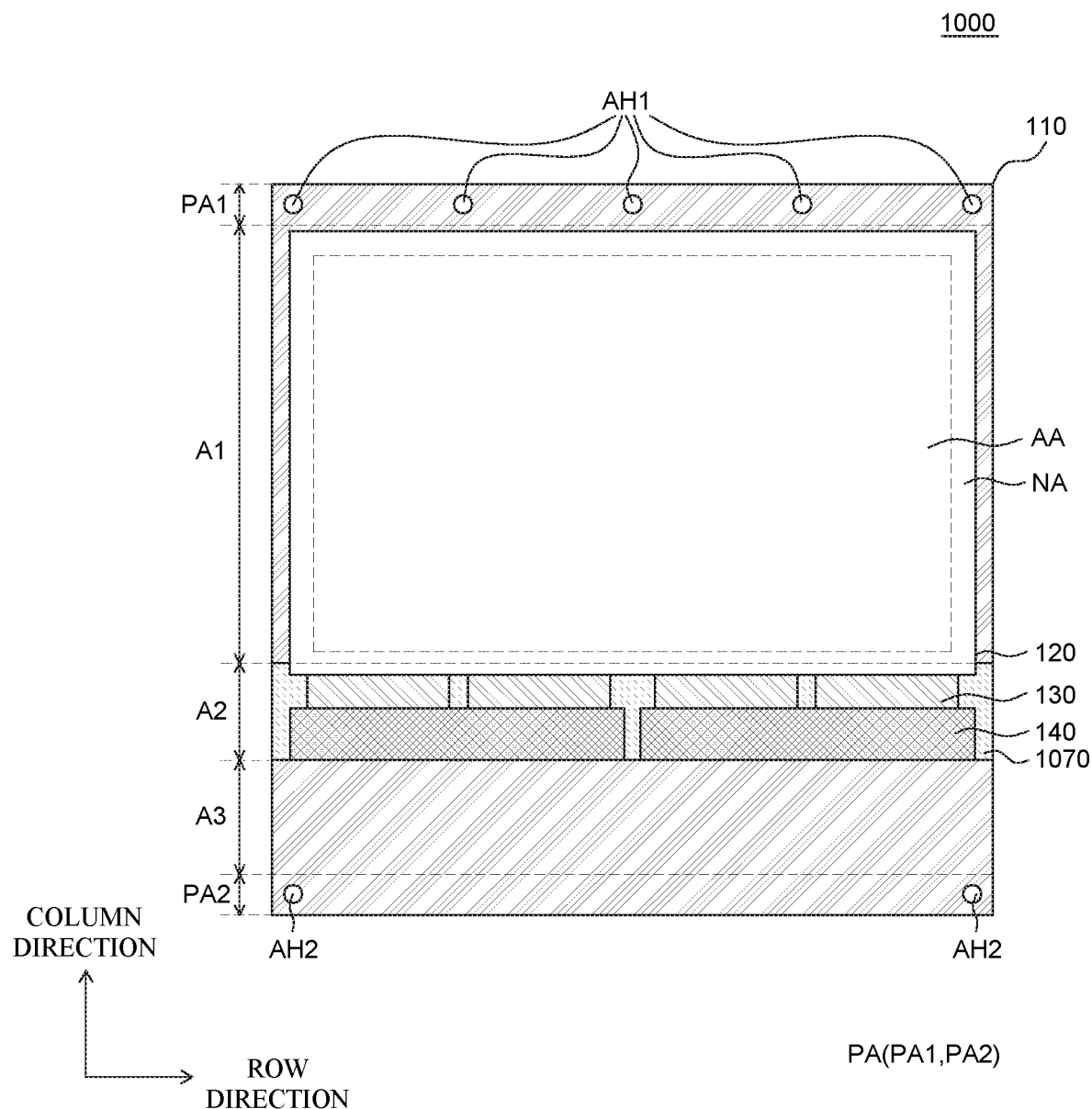
FIG. 10 is a plan view of a display device according to still another example embodiment of the present disclosure.

FIG. 10 is a plan view of a display device according to still another example embodiment of the present disclosure. A display device 1000 of FIG. 10 may have substantially the same configuration as the example display device 100 of FIGS. 1 to 7C, except for the addition of a shielding layer 1070. Thus, a redundant description of the same or similar components may be omitted. In FIG. 10, for the convenience of description, among various components of the display device 1000, only the display panel 120, the flexible films 130, the printed circuit boards 140, the back cover 110, and the shielding layer 1070 are illustrated.

As illustrated in FIG. 10, the shielding layer 1070 may be disposed in the second area A2 of the display device 1000. Specifically, the shielding layer 1070 may be disposed in the second area A2 between the back cover 110 on one hand and the flexible film 130 and the printed circuit board 140 on the other. However, the present disclosure is not limited thereto, and the shielding layer 1070 may be disposed between the back cover 110 and one or more flexible films 130, or between the back cover 110 and one or more printed circuit boards 140. That is, the shielding layer 1070 may be disposed between the back cover 110 and at least one of the flexible films 130 and the printed circuit boards 140. The shielding layer 1070 may be disposed in the second area A2 by being attached to the back cover 110 or being coated or cured, but is not limited thereto.

The shielding layer 1070 may shield the interference between the back cover 110 including a magnetic material and the flexible films 130 and the printed circuit boards 140. Therefore, the shielding layer 1070 may be formed of an insulating material, such as a silicon resin, but is not limited thereto. For example, any material capable of shielding the potential interference caused by the magnetic property of the back cover 110 on the flexible films 130 and the printed circuit boards 140 may be employed.

Various conductive materials, such as wiring lines and ICs, may be mounted on the flexible films 130 and the printed circuit boards 140, and the magnetic field generated by the magnetic material included in the back cover 110 may cause interference with the flexible films 130 and the printed circuit boards 140. In the display device 1000 according to an example embodiment of the present disclosure, the shielding layer 1070 may be disposed in the second area A2 of the display device 1000 to shield the flexible films 130 and the printed circuit boards 140 from the interference that may be generated due to the magnetic property of the back cover 110. Specifically, the shielding layer 1070 formed of an insulating material may be disposed between the back cover 110 having a magnetic material and the flexible films 130 and the printed circuit boards 140, in which conductive material is disposed, to reduce any interference generated in the flexible films 130 and the printed circuit boards 140 due to the magnetic property of the back cover 110.

<Back Cover Overlapping a Display Panel>

Figure 11:
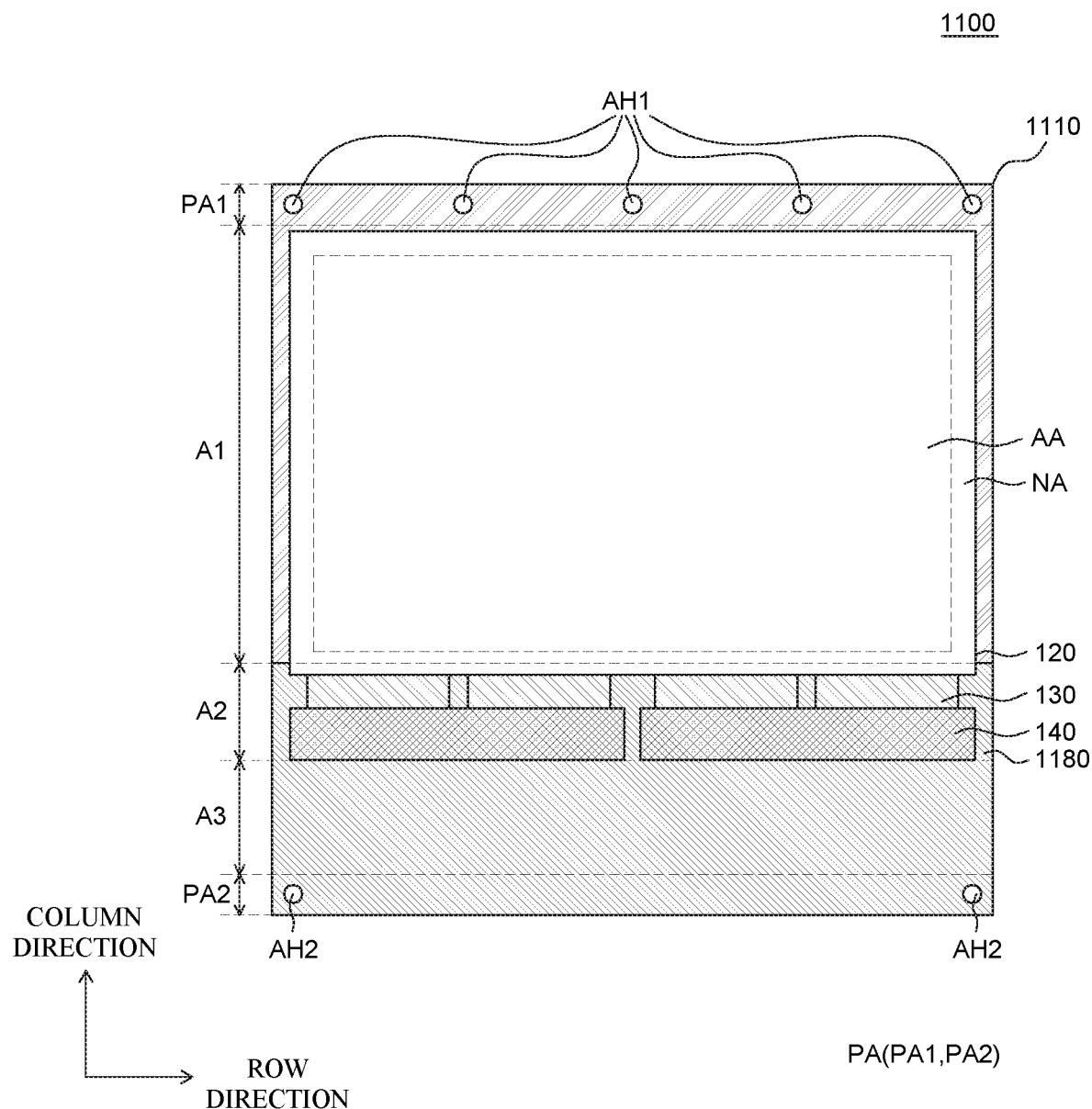
FIG. 11 is a plan view of a display device according to still another example embodiment of the present disclosure.

FIG. 11 is a plan view of a display device according to still another example embodiment of the present disclosure. A display device 1100 of FIG. 11 may have substantially the same configuration as the example display device 1000 of FIG. 10, except for a back cover 1110 and a protective layer 1180, and possibly the shielding layer 1070 in the display device 1000. Thus, a redundant description of the same or similar components may be omitted. In FIG. 11, for the convenience of description, among various components of the display device 1100, only the display panel 120, the flexible films 130, the printed circuit boards 140, the back cover 1110, and the protective layer 1180 are illustrated.

As illustrated in FIG. 11, the back cover 1110 and the protective layer 1180 may be disposed in the first supporting area PA1 of the display device 1100. In this case, first fastening holes AH1 may be disposed in the back cover 1110 and the protective layer 1180 in the first supporting area PA1 to be fastened with the head bar.

As shown in FIG. 11, the back cover 1110 and the protective layer 1180 may be disposed in the first area A1 of the display device 1100. Specifically, the protective layer 1180 may be disposed on a surface of the back cover 1110 opposite the surface on which the display panel 120 is disposed.

As illustrated in FIG. 11, the protective layer 1180 may be disposed in the second area A2 and the third area A3 of the display device 1100. That is, the back cover 1110 may be disposed in the first area A1, but not the second area A2 or the third area A3, whereas the protective layer 1180 may be disposed in each of the first area A1, the second area A2, and the third area A3. Therefore, the protective layer 1180 may be larger and longer than the back cover 1110.

As shown in FIG. 11, the protective layer 1180 may also be disposed in the second supporting area PA2. In this case, the back cover 1110 may not be disposed in the second supporting area PA2, but the protective layer 1180 may be fastened with the roller 151 through the second fastening holes AH2 in the protective layer 1180 in the second supporting are PA2. However, the present disclosure is not limited to this particular example. For example, the protective layer 1180 may be fixed to the roller 151 directly or through an adhesive layer without the use of a separate fastening hole.

Further, in FIG. 11, the back cover 1110 is illustrated as being disposed in the first supporting area PA1 and the first area A1, and the protective layer 1180 in the first supporting area PA1, the first area A1, the second area A2, the third area A3, and the second supporting area PA2. However, as an alternative configuration, the back cover 1110 may be disposed in the first supporting area PA1 and the first area A1, and the protective layer 1180 may be disposed in the second area A2, the third area A3, and the second supporting area PA2. In this case, an end of the back cover 1110 may be fixed to an end of the protective layer 1180 with an adhesive layer or another mechanism, such as a screw, but the disclosure is not limited thereto.

In the display device 1100 according to an example embodiment of the present disclosure, the back cover 1110 may be disposed in the first area A1 to overlap the display panel 120, but not in the second are A2, so that the interference that may be generated in the flexible films 130 and the printed circuit boards 140 due to the magnetic property of the back cover 1110 may be reduced. Specifically, since the back cover 1110 may include or be formed of a magnetic material, if the back cover 1110 is disposed in the second area A2 in which the flexible films 130 and the printed circuit boards 140 are disposed, the magnetic property of the back cover 1110 may generate interference with the flexible films 130 and the printed circuit boards 140. Therefore, the back cover 1110 may be disposed in the first area A1 and not in the second area A2 so that, even though a separate element (e.g., a shielding layer 1070 of FIG. 10) is not disposed between the back cover 1110 and the flexible films 130 and the printed circuit boards 140, any interference in the flexible films 130 and the printed circuit boards 140 that may be caused by the magnetic property of the back cover 110 may be reduced.

Further, in the display device 1100 according to an example embodiment of the present disclosure, the protective layer 1180 may be disposed in the second area A2 and the third area A3 without the back cover 1110 being disposed in those areas so that the rolling property of the display device 1100 may be improved. Since the protective layer 1180 may be formed of a resin, the modulus of the protective layer 1180 may be lower than the modulus of the back cover 1110 including a magnetic material. By disposing the protective layer 1180, but not the back cover 1110, in the second area A2 and the third area A3, the stress generated in the second area A2 and the third area A3 during the winding the display device 1100 may be reduced. Therefore, in the display device 1100 according to an example embodiment of the present disclosure, instead of the back cover 1110, the protective layer 1180 may be configured to be fixed to the roller 151 to improve the rolling property of the display device 1100.

<Back Cover Including a Pattern>

Figure 12:
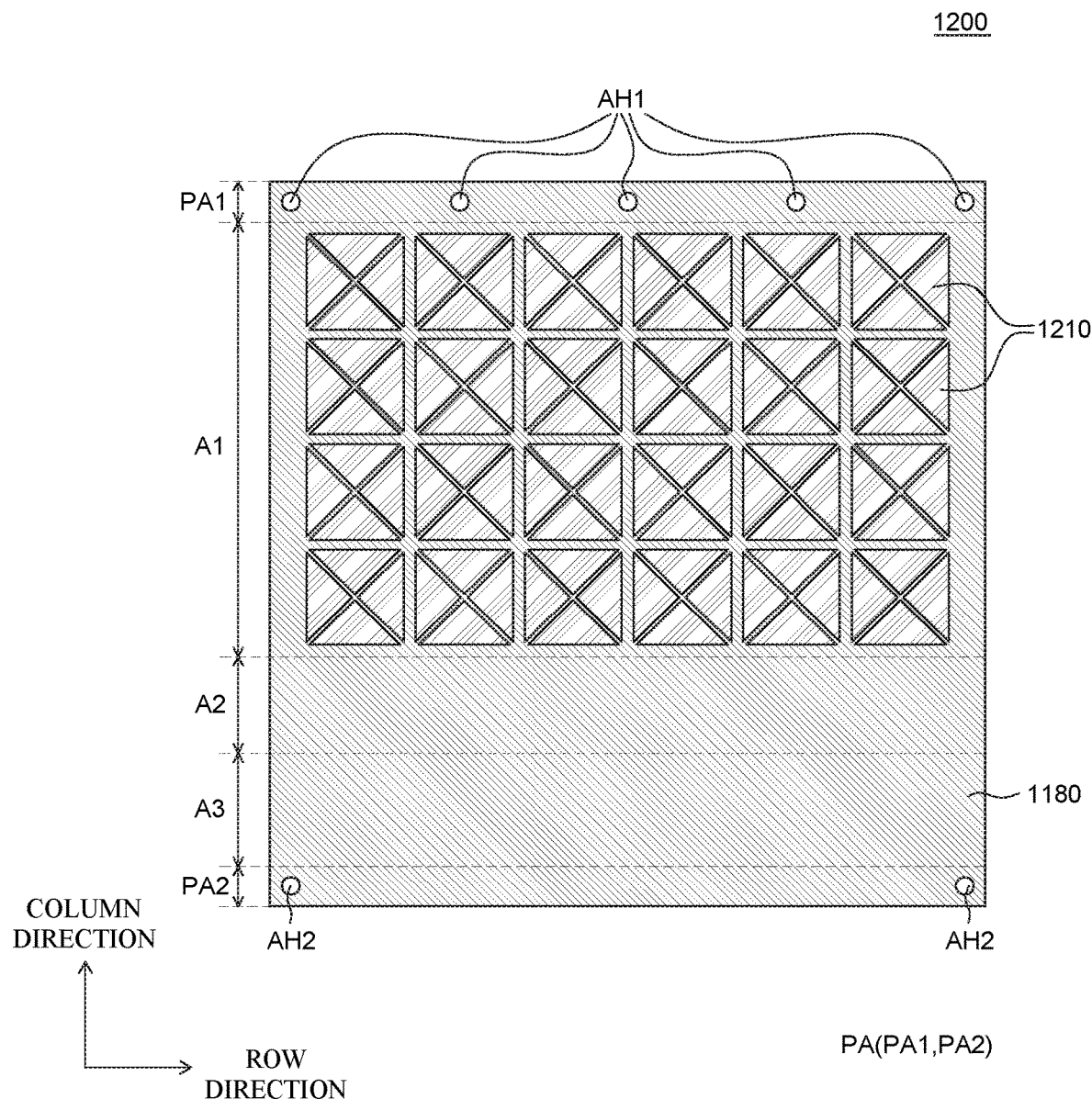
FIG. 12 is a plan view of a display device according to still another example embodiment of the present disclosure.

FIG. 12 is a plan view of a display device according to still another example embodiment of the present disclosure. A display device 1200 of FIG. 12 may have substantially the same configuration as the example display device 1100 of FIG. 11, except a back cover 1210. Thus, a redundant description of the same or similar components may be omitted. In FIG. 12, for the convenience of description, among various components of the display device 1200, only the back cover 1210 and the protective layer 1180 are illustrated.

As illustrated in FIG. 12, the back cover 1210 may include a plurality of back cover patterns spaced apart from one another. For example, the back cover 1210 may include a plurality of back cover patterns having a triangular shape, but is not limited thereto. The back cover pattern may have various other shapes, such as a polygonal shape, a circular shape, and an oval shape.

In the display device 1200 according to an example embodiment of the present disclosure, the back cover 1210 may include a plurality of back cover patterns spaced apart from one another, thereby improving the rolling property of the display device 1200. For example, if the back cover 1210 is integrally formed as a single body (see, e.g., back cover 110 or 1110), during the winding of the display device 1200, a stress may be generated in the back cover 1210 along the rolling direction. This stress may cause damages to the back cover 1210 and the display panel. However, in the display device 1200 according to an example embodiment of the present disclosure, the plurality of back cover patterns which forms the cover 1210 may reduce the stress generated at the time of winding the back cover 1210. Further, the plurality of back cover patterns of the back cover 1210 may be disposed to be spaced apart from one another in a column direction, a row direction, and/or a diagonal direction so that, even if the back cover 1210 is wound in various directions, the stress generated in the back cover 1210 during the winding of the display device 1200 may be reduced.

<Back Cover Including an Edge Area>

Figure 13:
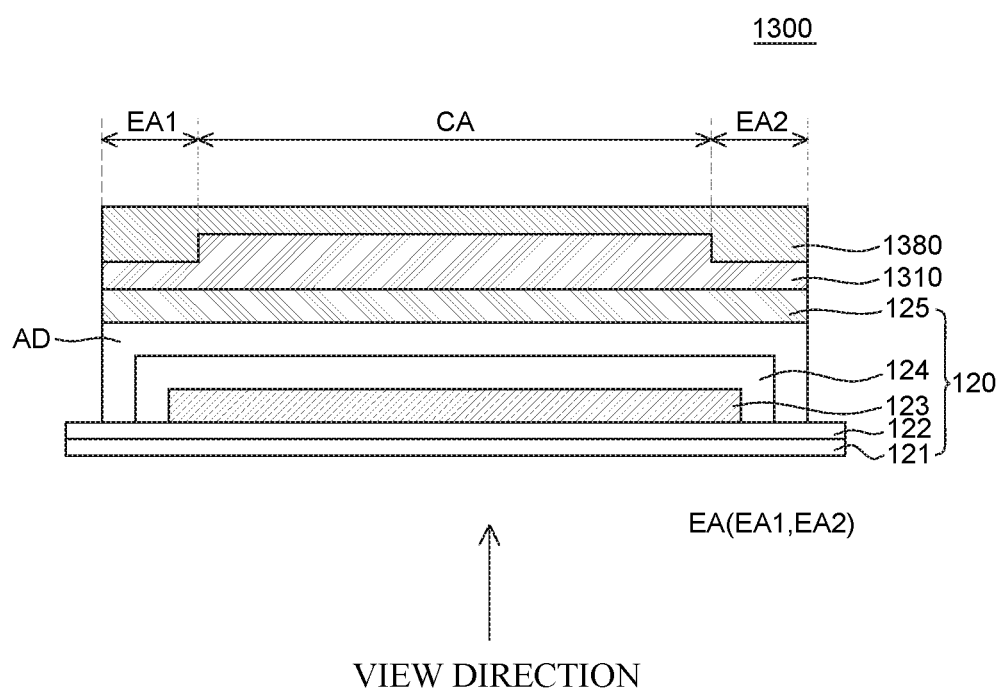
FIG. 13 is a cross-sectional view of a display device according to still another example embodiment of the present disclosure.

FIG. 13 is a cross-sectional view of a display device according to still another example embodiment of the present disclosure. A display device 1300 of FIG. 13 may have substantially the same configuration as the example display device 900 of FIG. 9, with the exception of a back cover 1310 and a protective layer 1380. Thus, a redundant description of the same or similar components may be omitted. In FIG. 13, for the convenience of description, among various components of the display device 1300, only the display panel 120, the back cover 1310, and the protective layer 1380 are illustrated.

As illustrated in FIG. 13, the back cover 1310 and the protective layer 1380 may be disposed to have a width corresponding to the width of the display panel 120. That is, the back cover 1310 and the protective layer 1380 may be disposed so as not to protrude from the lateral ends of the display panel 120. However, the present disclosure is not limited thereto. For example, the back cover 1310 and the protective layer 1380 may be disposed so as to protrude from one or both lateral ends of the display panel 120.

As shown in FIG. 13, the back cover 1310 may include a center area CA and edge areas EA at both sides of the center area CA. The edge areas EA of the back cover 1310 may include a left edge area EA1 disposed at a left side of the center area CA and a right edge area EA2 disposed at a right side of the center area CA.

As illustrated in FIG. 13, the thickness of the back cover 1310 in the center area CA may be larger than the thickness of the back cover 1310 in the edge areas EA. That is, the center area CA of the back cover 1310 may be formed to be thicker than the left edge area EA1 and the right edge area EA2.

As shown in FIG. 13, the protective layer 1380 may be disposed on the back cover 1310. The protective layer 1380 may be disposed to be in contact with the back cover 1310 and disposed to correspond to the thickness of the back cover 1310. That is, the protective layer 1380 disposed in the edge areas EA of the back cover 1310 may be thicker than the protective layer 1380 disposed in the center area CA of the back cover 1310 so that a surface of the protective layer 1380 opposite the back cover 1310 may be flat.

In the display device 1300 according to an example embodiment of the present disclosure, the thickness of the back cover 1310 in the edge areas EA may be smaller than the thickness of the back cover 1310 in the center area CA. The back cover 1310 may be more easily detached from the display panel 120. For example, the back cover 1310 may have a magnetic property and may be attached to the encapsulating substrate 125 of the display panel 120 without using a separate adhesive layer. In this case, the back cover 1310 may be more easily detached and replaced in the event of a design change request by the user or a damage to the back cover 1310. In the display device 1300 according to an example embodiment of the present disclosure, the thickness of the edge area EA of the back cover 1310 may be formed to be small. When the user detaches the back cover 1310 using the edge area EA of the back cover 1310, the back cover 1310 may be more easily detached. Accordingly, in the display device 1300 according to an example embodiment of the present disclosure, the back cover 1310 may be more easily detached from a display panel 120 and may be attached to another display panel 120. Thus, the back cover 1310 may be reused.

<Display Device Including a Reinforcing Member>

Figure 14:
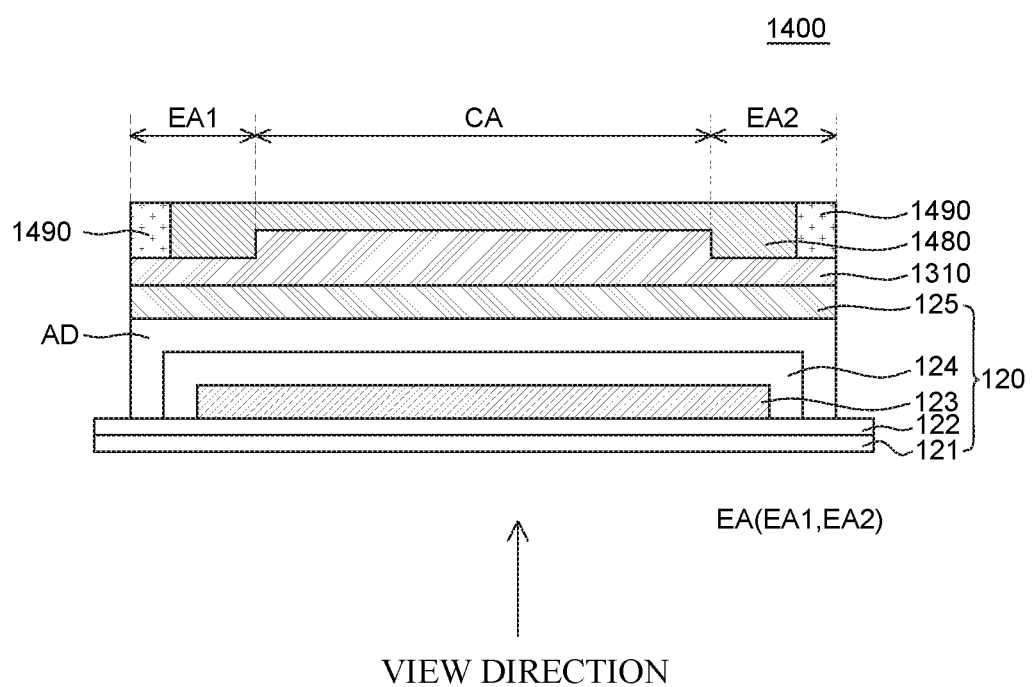
FIG. 14 is a cross-sectional view of a display device according to still another example embodiment of the present disclosure.

FIG. 14 is a cross-sectional view of a display device according to still another example embodiment of the present disclosure. A display device 1400 of FIG. 14 may have substantially the same configuration as the example display device 1300 of FIG. 13, except for a protective layer 1480 and a reinforcing member 1490. Thus, a redundant description of the same or similar components may be omitted. In FIG. 14, for the convenience of description, among various components of the display device 1400, only the display panel 120, the back cover 1310, the protective layer 1480, and the reinforcing member 1490 are illustrated.

As shown in FIG. 14, the reinforcing member 1490 may be disposed in the edge areas EA of the back cover 1310 and may be disposed at lateral ends of the back cover 1310. Further, the reinforcing member 1490 may be disposed to be in contact with both side surfaces of the protective layer 1480 disposed on the back cover 1310.

In this case, a modulus of the reinforcing member 1490 may be higher than a modulus of the protective layer 1480. The reinforcing member 1490 may be formed of a metal material, a plastic, or the like, but is not limited thereto.

In the display device 1400 according to an example embodiment of the present disclosure, the reinforcing member 1490 may be disposed to be in contact with the protective layer 1480 to improve a side surface rigidity of the display device 1400. Specifically, if the protective layer 1480 is disposed in the second area A2 and the third area A3 of the display device 1400 without the back cover 1310 being disposed in those areas, the flexibility of the display device 1400 may be increased. If the side surfaces of the display device 1400 receives an impact, the display device 1400 may be more easily damaged. Accordingly, the reinforcing member 1490 may be disposed to be in contact with both side surfaces of the protective layer 1480 to reduce potential damages caused by the impact on the side surfaces of the display device 1400, thereby suppressing or minimizing potential damages to the display device 1400.

The example embodiments of the present disclosure can also be described as follows:

According to an aspect of the present disclosure, a display device may include a display panel configured to display an image; a back cover on a rear surface of the display panel and including a magnetic material; and a roller configured to wind or unwind the back cover and the display panel.

The back cover may include a resin and a plurality of magnetic material particles dispersed in the resin.

The display device may comprise a first area and a second area extending from the first area, wherein the display panel and the back cover may be disposed in the first area. The display device may further comprise a flexible film and a printed circuit board in the second area and electrically connected to the display panel.

The display device may further comprise a protective layer in the first and second areas, wherein the protective layer may be on a surface of the back cover facing away from the display panel in the first area. The flexible film and the printed circuit board may be disposed on the protective layer in the second area, and the back cover may not be disposed in the second area in an unwound state.

The protective layer may be fixed to the roller.

The display device may further comprise a shielding layer in the second area. The back cover may further be disposed in the second area, and the shielding layer may be disposed between the back cover and at least one of the flexible film and the printed circuit board.

The display device may further comprise a protective layer covering a surface of the back cover facing away from the display panel.

The back cover may include a center area and edge areas at respective lateral sides of the center area, the protective layer covering the center area and the edge areas of the back cover. A thickness of the back cover in the center area may be larger than a thickness of the back cover in the edge areas, and a portion of the protective layer covering the edge areas have a larger thickness than a portion of the protective layer covering the center area.

The display device may further comprise a reinforcing member on at least one of the edge areas of the back cover and contacting at least one side surface of the protective layer.

A modulus of the protective layer may be lower than a modulus of the reinforcing member.

The back cover may include a plurality of back cover patterns spaced apart from each other.

According to another aspect of the present disclosure, a display device may comprise a display panel configured to display images and including a substrate; a back cover including a magnetic material and attached to the substrate of the display panel, the substrate including a metal material; and a roller configured to wind or unwind the back cover and the display panel.

The display device may further comprise a flexible film on the back cover and connected to the display panel; and a printed circuit board on the back cover and connected to the flexible film. The back cover may be fixed to the roller.

The roller may have a flat surface and a curved surface, and the flexible film and the printed circuit board may be configured to be on the flat surface of the roller with the back cover wound around the roller.

The display device may further comprise a shielding layer between the back cover and at least one of the flexible film and the printed circuit board.

The display device may further comprise a protective layer covering a surface of the back cover facing away from the display panel.

The display device may further comprise a flexible film on the protective layer and connected to the display panel; and a printed circuit board on the protective layer and connected to the flexible film. The protective layer may be fixed to the roller.

The back cover may include a center area and an edge area at a lateral side of the center area, the protective layer covering the center area and the edge area of the back cover. A thickness of the back cover in the center area may be larger than a thickness of the back cover in the edge area, and a portion of the protective layer covering the edge area may have a larger thickness than a portion of the protective layer covering the center area.

The display device may further comprise a reinforcing member disposed on the edge area of the back cover and contacting a side surface of the protective layer.

The back cover may include a plurality of back cover patterns spaced apart from each other.

Although the example embodiments of the present disclosure are described above in detail with reference to the accompanying drawings, the present disclosure is not limited thereto and may be embodied in many different forms without departing from the technical concept of the present disclosure. Therefore, the example embodiments of the present disclosure are provided for illustrative purposes only and are not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following appended claims, and all the technical concepts in the equivalent scope thereof should be construed as falling within the scope of the present disclosure.

It will be apparent to those skilled in the art that various modifications and variations can be made in the display device of the present disclosure without departing from the spirit or scope of the disclosure. Thus, it is intended that the present disclosure cover the modifications and variations of this disclosure provided they come within the scope of the appended claims and their equivalents.

What is claimed is:

1. A display device, comprising:
a display panel configured to display an image, the display panel including a substrate, a pixel unit on a rear surface of the substrate, and an encapsulating layer covering a rear surface and a side surface of the pixel unit;
a back cover on a rear surface of the encapsulating layer of the display panel and including a magnetic material;
a protective layer on a rear surface of the back cover facing away from the display panel and including an insulating material;
a roller configured to wind or unwind the protective layer, the back cover, and the display panel together around the roller;
a flexible film and a printed circuit board on the display panel and electrically connected to the display panel; and
a shielding layer between the back cover and at least one of the flexible film and the printed circuit board,
wherein the display panel and the back cover are coupled to each other in a wound state and in an unwound state,
wherein the protective layer is disposed in an area overlapping the back cover,
wherein the shielding layer shields the at least one of the flexible film and the printed circuit board from an interference caused by a magnetic property of the back cover, and
wherein the shielding layer is formed of an insulating material.

2. The display device of claim 1, wherein the back cover includes a resin and a plurality of magnetic material particles dispersed in the resin.

3. The display device of claim 1, comprising a first area and a second area extending from the first area,
wherein the display panel and the back cover are disposed in the first area, and
wherein the flexible film and the printed circuit board are disposed in the second area.

4. The display device of claim 3,
wherein the flexible film and the printed circuit board are disposed on the protective layer in the second area, and the back cover is not disposed in the second area in an unwound state.

5. The display device of claim 4, wherein the protective layer is fixed to the roller.

6. The display device of claim 3, wherein the shielding layer is disposed in the second area, and
wherein the back cover is further disposed in the second area.

7. The display device of claim 1, wherein the back cover includes a center area and edge areas at respective lateral sides of the center area, the protective layer covering the center area and the edge areas of the back cover, and
wherein a thickness of the back cover in the center area in a first direction perpendicular to the rear surface of the substrate is larger than a thickness of the back cover in the edge areas in the first direction, and a portion of the protective layer covering the edge areas has a larger thickness in the first direction than a portion of the protective layer covering the center area.

8. The display device of claim 7, further comprising:
a reinforcing member on at least one of the edge areas of the back cover and contacting at least one side surface of the protective layer.

9. The display device of claim 1, wherein the back cover includes a plurality of separate back cover patterns spaced apart from each other.

10. The display device of claim 1, wherein the protective layer is configured to be disposed between the front surface of the display panel and the back cover and prevent the back cover from contacting the front surface of the display panel in a wound state around the roller.

11. The display device of claim 1, wherein the protective layer is an insulating layer formed of one or more insulating materials,
wherein the display panel further includes:
an encapsulating substrate including a metal material and covering a rear surface of the encapsulating layer without covering a side surface of the encapsulating layer; and
an adhesive member between the encapsulating layer and the encapsulating substrate and covering the rear surface and a side surface of the encapsulating layer, the adhesive member bonding the encapsulating layer and the encapsulating substrate to each other, and wherein the encapsulating substrate covers a rear surface of the adhesive member without covering a side surface of the adhesive member.

12. A display device, comprising:
a display panel configured to display images and including a substrate, a pixel unit on a rear surface of the substrate, an encapsulating layer covering a rear surface and a side surface of the pixel unit, and an encapsulating substrate on a rear surface of the encapsulating layer;
a back cover including a magnetic material and attached to a rear surface of the encapsulating substrate of the display panel, the encapsulating substrate including a metal material;
a protective layer on a rear surface of the back cover facing away from the display panel and including an insulation material;
a roller configured to wind or unwind the protective layer, the back cover, and the display panel together around the roller;
a flexible film and a printed circuit board on the display panel and electrically connected to the display panel; and
a shielding layer between the back cover and at least one of the flexible film and the printed circuit board,
wherein the shielding layer shields the at least one of the flexible film and the printed circuit board from an interference caused by a magnetic property of the back cover, and
wherein the shielding layer is formed of an insulating material.

13. The display device of claim 12, wherein:
the flexible film is disposed on the back cover and connected to the display panel,
the printed circuit board is disposed on the back cover and connected to the flexible film, and
the back cover is fixed to the roller.

14. The display device of claim 12, wherein both edges of the back cover protrude from both edges of the display panel corresponding to both edges of the back cover.

15. The display device of claim 12, wherein:
the flexible film is disposed on the protective layer and connected to the display panel,
the printed circuit board is disposed on the protective layer and connected to the flexible film, and
the protective layer is fixed to the roller.

16. The display device of claim 12, wherein the back cover includes a center area and an edge area at a lateral side of the center area, the protective layer covering the center area and the edge area of the back cover, and
wherein a thickness of the back cover in the center area in a first direction perpendicular to the rear surface of the encapsulating substrate is larger than a thickness of the back cover in the edge area in the first direction, and a portion of the protective layer covering the edge area has a larger thickness in the first direction than a portion of the protective layer covering the center area.

17. The display device of claim 16, further comprising:
a reinforcing member disposed on the edge area of the back cover and contacting a side surface of the protective layer.

18. The display device of claim 12, wherein the back cover includes a plurality of separate back cover patterns spaced apart from each other.

19. The display device of claim 12, wherein the protective layer is configured to be disposed between the front surface of the display panel and the back cover and prevent the back cover from contacting the front surface of the display panel in a wound state around the roller.

20. The display device of claim 12, wherein the protective layer is an insulating layer formed of one or more insulating materials,
wherein the display panel further includes an adhesive member between the encapsulating layer and the encapsulating substrate and covering the rear surface and a side surface of the encapsulating layer, the adhesive member bonding the encapsulating layer and the encapsulating substrate to each other, and
wherein the encapsulating substrate covers a rear surface of the adhesive member without covering a side surface of the adhesive member.

\* \* \* \* \*